United States Patent
Kojima et al.

(10) Patent No.: US 7,392,327 B2
(45) Date of Patent: Jun. 24, 2008

(54) INFORMATION PROCESSING APPARATUS CAPABLE OF ACCURATELY SETTING PRESENT TIME, AND INFORMATION PROCESSING METHOD FOR THE INFORMATION PROCESSING APPARATUS, AND PROGRAM FOR IMPLEMENTING THE METHOD

(75) Inventors: Nobuyuki Kojima, Kanagawa (JP); Takeshi Oya, Kanagawa (JP)

(73) Assignee: Canon Kabushiki Kaisha (JP)

( * ) Notice: Subject to any disclaimer, the term of this patent is extended or adjusted under 35 U.S.C. 154(b) by 930 days.

(21) Appl. No.: 10/755,031

(22) Filed: Jan. 9, 2004

(65) Prior Publication Data
US 2004/0220999 A1    Nov. 4, 2004

(30) Foreign Application Priority Data
Jan. 10, 2003  (JP)  ............................ 2003-004822
Oct. 31, 2003  (JP)  ............................ 2003-373368

(51) Int. Cl.
G06F 15/16    (2006.01)
G06F 15/177   (2006.01)

(52) U.S. Cl. ........................................ 709/248; 709/220

(58) Field of Classification Search ................. 709/200, 709/204–207, 248, 220–222, 227–228; 713/400, 713/401
See application file for complete search history.

(56) References Cited

FOREIGN PATENT DOCUMENTS

| JP | 9-127274 A    | 5/1997  |
|----|---------------|---------|
| JP | 09200419 (A)  | 7/1997  |
| JP | 10-334027 A   | 12/1998 |
| JP | 11-298517 A   | 10/1999 |
| JP | 2001-202156 A | 7/2001  |
| JP | 2002-071778 A | 3/2002  |
| JP | 2004-125705 A | 4/2004  |

Primary Examiner—Paul H Kang
(74) Attorney, Agent, or Firm—Rossi, Kimms & McDowell, LLP

(57) ABSTRACT

There is provided an information processing apparatus which is capable of accurately setting the present time by acquiring time information without using a dedicated time acquisition program and at low costs. The information processing apparatus manages counter information indicating output states of image forming apparatuses connected thereto via a network. The information processing apparatus transmits an e-mail addressed to itself and receives the same e-mail, and then sets the present time based on the time of the transmission of the e-mail, and the time of reception of the e-mail by a server connected to the network.

12 Claims, 18 Drawing Sheets

FIG. 14

```
#!/bin/sh
date 101013312003
```

FIG. 16

```
01 * * * * /var/tmp/backup_date.sh
02 4* * * /var/tmp/daily
0 7 * * 0/var/tmp/weekly
```

INFORMATION PROCESSING APPARATUS CAPABLE OF ACCURATELY SETTING PRESENT TIME, AND INFORMATION PROCESSING METHOD FOR THE INFORMATION PROCESSING APPARATUS, AND PROGRAM FOR IMPLEMENTING THE METHOD

BACKGROUND OF THE INVENTION

1. Field of the Invention

The present invention relates to an information processing apparatus connected to a network on which a server capable of processing e-mails exists, and capable of transmitting/receiving e-mails, and more particularly relates to an information processing apparatus which does not include an RTC (real time clock), and a method for managing counter information of the information processing apparatus and a program for implementing the method.

2. Description of the Related Art

In general, in many apparatuses designed to carry out an specific operation at a specified time, a battery with a small capacity is integrated into the apparatus, and even when the main power supply is off, a real time clock (RTC) is kept operating for a sustained update of the present time, and enables the apparatus to carry out the specific operation according to the predetermined schedule after the main power supply is turned on again.

For example, a printing apparatus has been known which corrects its own time by obtaining time information from an information processing apparatus (refer to Japanese Laid-Open Patent Publication (Kokai) No. H09-200419).

On the other hand, among this type of apparatuses, a computer connected to a network can obtain time information using various types of time obtaining programs such as one using NTP (Network Time Protocol) or the RSYNC from a server.

Alternatively, in the case of an information processing apparatus does not include an RTC, the apparatus may force a user to set a time on its startup, or may start counting time elapsed from an initialized time such as "00:00 a.m. Jan. 1, 1970", which is stored in the apparatus. For example, in the case of an information processing apparatus having a communication function such as one based on the Internet or the GPS, the apparatus acquires time using this communication function.

However, in the case where the apparatus itself incorporates a battery serving as a power supply, the cost increases and a countermeasure is also necessary against a battery exhaustion. Additionally, necessity of a battery replacement places a restriction on the packaging of the apparatus.

Further, in the case where the apparatus forces a user to set a time on its startup, a means for setting the time is required.

Still further, in the case where the information processing apparatus resets its time to an initialized time on its startup due to unavailability of an RTC, the time stored in the information processing apparatus is reset every time the apparatus starts.

Still further, in the case where the information processing apparatus acquires time using a communication function, time cannot be obtained if the communication function fails.

In addition, a system has been known in which a charge on a user is calculated based on the number of output sheets for a predetermined time period on the terminal installed in the user side. This system, however, can suffer from the problem that if time information accompanying counter information as charge information obtained from the terminal installed in the user side is incorrect, the user will be charged an incorrect amount. Therefore, this type of maintenance/management system for an image forming apparatuses described above is required to manage time more precisely.

SUMMARY OF THE INVENTION

It is a first object of the present invention to provide an information processing apparatus and an information processing method for the same, which are capable of accurately setting the present time by acquiring time information without using a dedicated time acquisition program and at low costs, and a program for implementing the information processing method.

It is a second object of the present invention to provide an information processing apparatus and an information processing method for the same, which are capable of acquiring accurate time information accompanying counter information as charge information, and a program for implementing the information processing method.

To attain the above described objects, in a first aspect of the present invention, there is provided an information processing apparatus connected to a network having thereon at least one server capable of processing e-mails, and at least one image forming apparatus, the information processing apparatus being capable of transmitting and receiving e-mails, and managing counter information indicating an output state of the image forming apparatus, the information processing apparatus comprising a managing device that manages the counter information, and a time setting device that transmits an e-mail addressed to the information processing apparatus, receives the e-mail, and then sets present time based on time of the transmission of the e-mail, and time of reception of the e-mail by the server.

According to the first aspect of the present invention, it is possible to realize a low-cost information processing apparatus that monitors various information on image forming apparatuses, and can acquire information relating to the present time without using a dedicated time acquisition program, to thereby accurately set the present time. As a result, precise charge information can be obtained from users, and a reliable maintenance system for the users can be provided.

Preferably, the information processing apparatus comprises an NTP time information acquisition device that acquires time information using NTP, and the time setting device carries out the setting of present time based on time of the transmission of the e-mail, and time of reception of the e-mail by the server, concurrently with the acquisition of the time information by the NTP time information acquisition device.

Preferably, the information processing apparatus comprises a storage device that retains time information, and the time setting device sets the present time based on the time information retained in the storage device upon startup of the information processing apparatus.

Preferably, the information processing apparatus comprises a mail time information acquisition device that acquires time of reception of the e-mail addressed to the information processing apparatus, and the time setting device overwrites the time acquired by the mail time information acquisition device or the NTP time information acquisition device on the present time set upon startup of the information processing apparatus.

More preferably, the information processing apparatus comprises an update device that updates the time information retained in the storage device in predetermined timing.

More preferably, the time setting device corrects the time information retained in the storage device based on predetermined correction information, and sets the present time based on the corrected information.

Preferably, the time setting device acquires information of the time from the mail time information-acquisition device when the time information has not been acquired by the NTP time information acquisition device.

Preferably, the information processing apparatus comprises a storage device that stores a history of processing carried out by the image forming apparatus in association with lapse of time, and a notification device that notifies the history stored in the storage device to a center existing on the network.

Preferably, the image forming apparatus comprises a printing device that carries out printing on a recording medium.

To attain the above objects, in a second aspect of the present invention, there is provided an information processing method for an information processing apparatus connected to a network having thereon at least one server capable of processing e-mails, and at least one image forming apparatus, the information processing apparatus being capable of transmitting and receiving e-mails, and managing counter information indicating an output state of the image forming apparatus, the method comprising a managing step of managing the counter information, and a time setting step of transmitting an e-mail addressed to the information processing apparatus, receiving the e-mail, and then setting present time based on time of the transmission of the e-mail, and time of reception of the e-mail by the server.

According to the second aspect of the present invention, there can be provided advantageous effects similar to those provided by the information processing apparatus according to the first aspect of the present invention.

Preferably, the information processing method comprises an NTP time information acquisition step of acquiring time information using NTP, and in the time setting step, the setting of present time is carried out based on time of the transmission of the e-mail, and time of reception of the e-mail by the server, concurrently with the acquisition of the time information by the NTP time information acquisition step.

Preferably, the information processing method comprises a storing step of retaining time information, and in the time setting step, the present time is set based on the time information retained in the storing step upon startup of the information processing apparatus.

Preferably, the information processing method comprises a mail time information acquisition step of acquiring time of reception of the e-mail addressed to the information processing apparatus, and in the time setting step, the time acquired in the mail time information acquisition step or the NTP time information acquisition step is overwritten on the present time set upon startup of the information processing apparatus.

More preferably, the information processing method comprises an update step of updating the time information retained in the storing step in predetermined timing.

More preferably, in the time setting step, the time information retained in the storing step is corrected based on predetermined correction information, and the present time is set based on the corrected information.

Preferably, in the time setting step, information of the time is acquired using the mail time information-acquisition step when the time information has not been acquired in the NTP time information acquisition step.

Preferably, the information processing method comprises a storing step of storing a history of processing carried out by the image forming apparatus in association with lapse of time, and a notification step of notifying the history stored in the storing step to a center existing on the network.

Preferably, the information processing method comprises a printing step of carrying out printing on a recording medium.

To attain the above objects, in a third aspect of the present invention, there is provided a program for causing a computer to implement an information processing method for an information processing apparatus connected to a network having thereon at least one server capable of processing e-mails, and at least one image forming apparatus, the information processing apparatus being capable of transmitting and receiving e-mails, and managing counter information indicating an output state of the image forming apparatus, the program comprising a managing module for managing the counter information, and a time setting module for transmitting an e-mail addressed to the information processing apparatus, receiving the e-mail, and then setting present time based on time of the transmission of the e-mail, and time of reception of the e-mail by the server.

According to the third aspect of the present invention, there can be provided advantageous effects similar to those provided by the information processing apparatus according to the first aspect of the present invention.

The above and other objects, features, and advantages of the invention will become more apparent from the following detailed description taken in conjunction with the accompanying drawings.

BRIEF DESCRIPTION OF THE DRAWINGS

FIG. 14 is a view showing an example of time information stored in a time storage section 1114 in FIG. 11;

FIG. 16 is a view showing an example of periodic processing information stored in a periodic processing execution section 1121 in FIG. 11.

DETAILED DESCRIPTION OF THE PREFERRED EMBODIMENTS

The present invention will now be described in detail with reference to the accompanying drawings showing preferred embodiments thereof.

Figure 1:
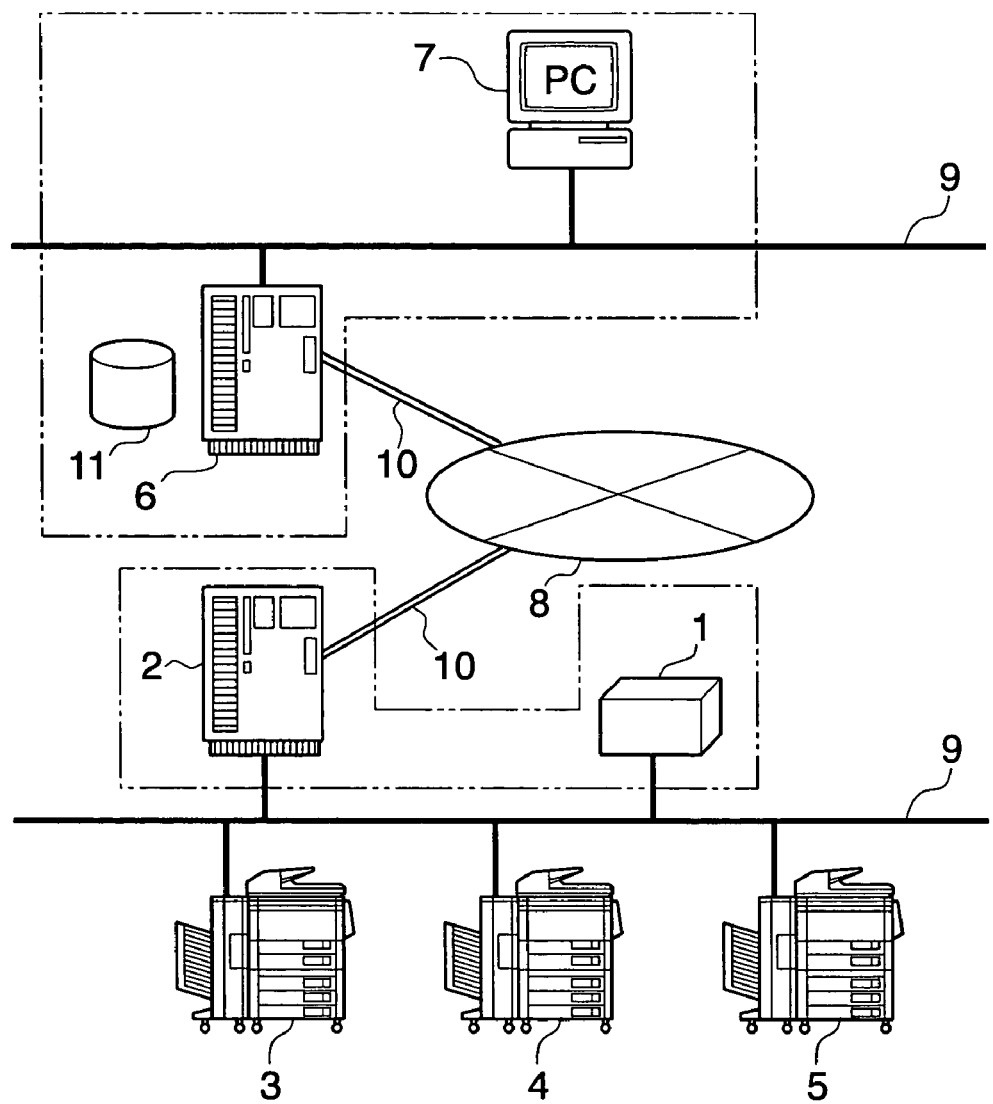
FIG. 1 is a schematic view showing an example of the overall construction of a device remote monitoring system to which a monitoring apparatus as an information processing apparatus according to a first embodiment of the present invention is connected.

FIG. 1 is a schematic view showing an example of the overall construction of a device remote monitoring system to which a monitoring apparatus as an information processing apparatus system is comprised of a monitoring apparatus 1, a terminal side management server 2, devices 3, 4, and 5, a center side management server 6, a center side client PC 7, a communication line 8, and a LAN (local area network) 9. Reference numeral 10 denotes a communication protocol.

In the device remote monitoring system, there exists the center side management server 6 having at least a construction which a general information processing apparatus has as a center side apparatus for supervising monitoring of the devices 3, 4, and 5. Further, there exist a database 11 for accumulating information, and the center side client PC 7 which is connected to the center side management server 6 via the LAN 9, and is operable independently or as a client of the center side management server 6. The center side management server 6 and the terminal side management server 2 can communicate with each other via the communication line 8 such as the Internet using the predetermined communication protocol 10. In the present embodiment, a general protocol (such as the SMTP (Simple-mail Transfer Protocol)) and an authentication function are also provided for preventing an unauthorized access and getting over (passing through) a firewall provided on the network. The center side management server 6 and the terminal side management server 2 can transmit and receive e-mails therebetween via the communication line 8 using an e-mail protocol. In e-mail processes described later with reference to FIG. 9, FIG. 10, FIGS. 13A and 13B, the function of this e-mail protocol is used. The function of e-mail (SMTP/POP) server may be provided in each of the center side management server 6 and the terminal side management server 2, or alternatively a computer serving as the e-mail server may be provided as a separate body for each of the center side management server 6 and the terminal side management server 2. Further alternatively, an e-mail server function as provided by ISP (Internet Service Provider) may be utilized.

What is important is that, to realize the processes in flowcharts shown in FIGS. 9, 10, 13A and 13B, it is a requisite that an accessible e-mail server should exist in either the monitoring apparatus 1 or the center side management server 6.

It should be noted that though only one center side management server 6 is provided in the present embodiment, a plurality of center side management servers 6 may be provided depending on intended purposes such as failure monitoring and counter information collection as described later.

On the other hand, on the terminal side of the device remote monitoring system, the terminal side management server 2 exists, and the monitoring apparatus 1 is connected to the LAN 9, for collecting information from the devices 3, 4, and 5 and personal computers, not shown. The monitoring apparatus 1 has a function of collecting maintenance information including operation information and failure information of the various devices 3, 4, and 5 with which the monitoring apparatus 1 can communicate via the LAN 9, has a function of providing control to update control programs and the like for the devices 3, 4, and 5, and a function of transferring the collected information to the center side management server 6 via the terminal side management server 6.

It should be noted that insofar as information can be shared between the monitoring apparatus 1 and the terminal side management server 2, and between the center side client PC 7 and the center side management server 6, these apparatuses may be provided as independent apparatuses as in the present embodiment, or these apparatuses may be provided as single apparatuses having the respective functions of the apparatuses (a single apparatus having the respective functions of the monitoring apparatus 1 and the terminal side management server 2, and a single apparatus having the respective functions of the center side client PC 7 and the center side management server 6). This alternative arrangement is shown by two-dot chain lines in FIG. 1. In the following description, it is assumed that the monitoring apparatus 1 communicates with the external center side management server 6 via the terminal side management server 2, but the terminal side management server 2 may also have the functions of the monitoring apparatus 1. In the following description, the monitoring apparatus 1 and the center side management server 6 transmit and receive information between them.

Although only one monitoring apparatus 1 and only one terminal side management server 2 are shown in FIG. 1, in actuality, the device remote monitoring system is constructed such that a plurality of monitoring apparatuses 1, a plurality of terminal side management servers 2, and the center side management server 6 which centrally manages these monitoring apparatuses 1 and terminal side management servers 2 communicate with each other via the communication line 8.

Examples of the devices 3, 4, and 5 include a printer (such as an electrophotographic type printer and an ink jet type printer) as an image forming apparatus having a printing section that carries out printing on a recording medium, a scanner as an image reading apparatus, a facsimile as an image communication apparatus, a digital multifunction apparatus as an image forming apparatus having a printer function and a facsimile function, a personal computer as an information processing apparatus, and a print server as an image processing apparatus. The image forming apparatus will be detailed later. Further, personal computers, not shown, are connected to the LAN 9 in the same manner as a computer 501 shown in FIG. 7, and have a function of generating PDL (Page Description Language) data from predetermined application data, for example, via an OS (Operating System) or a printer driver, and then transmitting the generated PDL data to the devices 3, 4, and 5 for output.

The monitoring apparatus 1 collects maintenance information including at least operation information such as operative states, a remaining toner quantity, and the number of printed sheets counted for respective sheet sizes of the devices 3, 4, and 5, operation information including CPU status, memory utilization status, and usage of rental application programs of the personal computers, paper jam information of the devices 3, 4, and 5, and various types of failure information including the number of restarts occurring in the personal computers.

Figure 2:
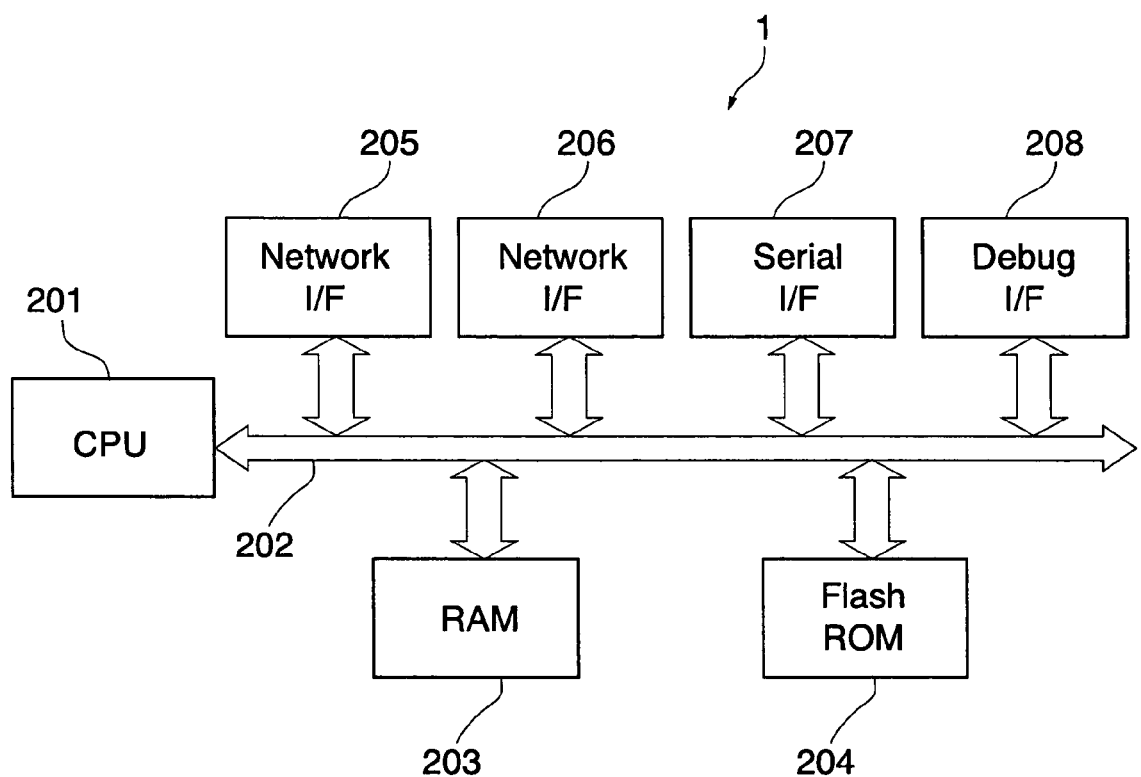
FIG. 2 is a block diagram showing the hardware construction of the monitoring apparatus in FIG. 1.

FIG. 2 is a block diagram showing the hardware construction of the monitoring apparatus 1 in FIG. 1. The monitoring apparatus 1 is comprised of a CPU 201, a bus 202, a RAM 203, and a flash ROM 204, as well as a plurality of interfaces (hereinafter simply referred to as "I/F") for various applications, namely, network I/F's 205 and 206, a serial I/F 207, and a debug I/F 208, all of which are provided in an ordinary information processing apparatus.

The CPU 201 controls the respective component parts independently and/or integrally, and carries out processes shown flowcharts in FIGS. 3 to 6, 9, and 10 according to programs stored in the flash ROM 204. The bus 202 is a common signal path for transmitting and receiving data between the component parts constituting the monitoring apparatus 1 in FIG. 2. The RAM 203 is a storage means that can electrically store information and is also rewritable. The flash ROM 204 is a non-volatile storage means that is electrically rewritable, and can also maintain information without power supply. The network I/F's 205 and 206 exchange information with the outside via the network. The serial I/F 207 exchanges information using the RS-232C serial communication. The debug I/F 208 is a serial communication section used for a debug application.

Although the monitoring apparatus 1 may be comprised of an input device such as a keyboard, a display section, a display control section, and the like, the monitoring apparatus 1 permits its settings to be changed such that a PC carried by a service person, for example, can be connected to the network I/F 205 or 206, to start configuration program stored inside the monitoring apparatus 1 from the PC, as described later. This can dispense with the provision of the input device, the display section, and the display control section, to thereby enable the monitoring apparatus 1 to be constructed at a low cost.

Since it is only necessary that the terminal side management server 2, the personal computers (not shown), the center side management server 6, and the center side client PC 7 shown in FIG. 1 have the construction of an ordinary information processing apparatus, and detailed description thereof, therefore, is omitted.

Figure 3:
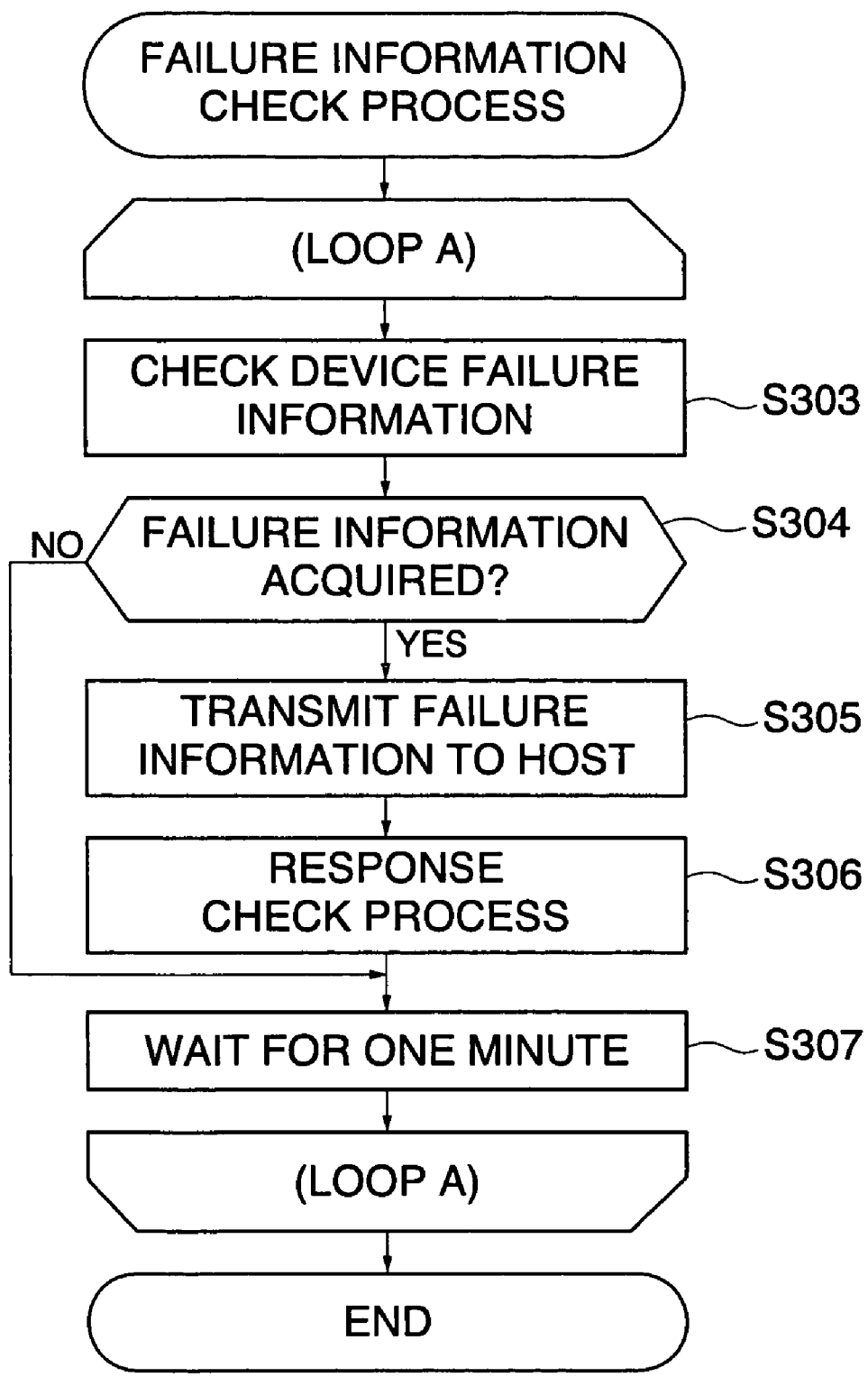
FIG. 3 is a flowchart showing a failure information check process carried out by the monitoring apparatus in FIG. 1.
Figure 4:
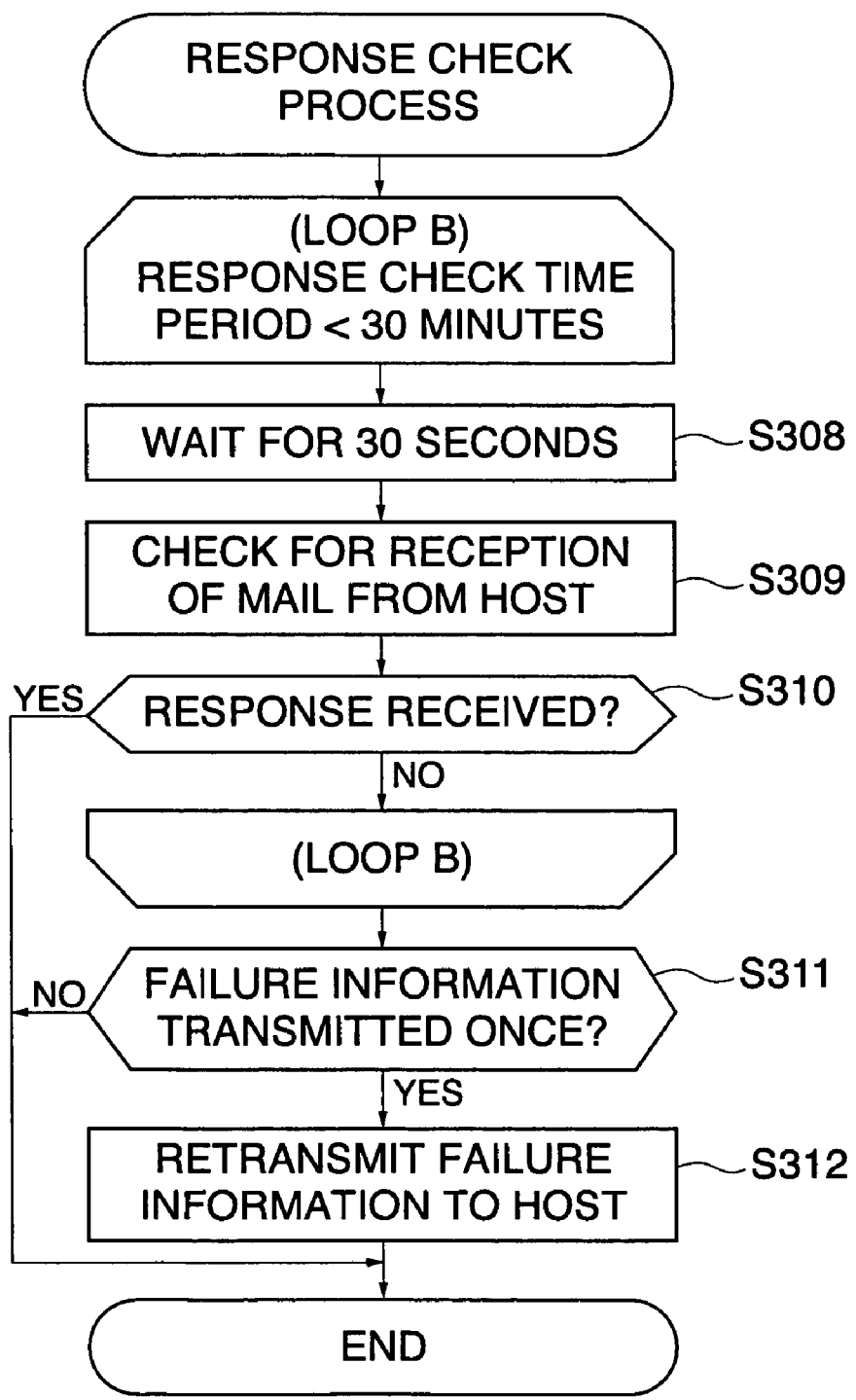
FIG. 4 is a flowchart showing a response check process carried out by the monitoring apparatus in FIG. 1.

FIG. 3 is a flowchart showing a failure information check process carried out by the monitoring apparatus 1 in FIG. 1. FIG. 4 is a flowchart showing a response check process carried out by the monitoring apparatus 1.

A description will now be given of a case where information is transmitted from the monitoring apparatus 1 to the terminal side management server 2, the center side management server 6 (hereinafter referred to as "the host" 6), or the center side client PC 7 using the SMTP (Simple-mail Transfer Protocol), and the monitoring apparatus 1 receives information using the POP (Post Office Protocol). In this connection, in steps S901 and S1305, describer later, the monitoring apparatus 1 uses NTP (Network Time Protocol). However, the present invention is not limited to these protocols, but, for example, HTTP (Hyper Text Transfer Protocol) may be used. In short, insofar as the processes in the flowcharts of FIG. 9, FIG. 10, FIGS. 13A and 13B can be realized, a variety of protocols can be applied.

The monitoring apparatus 1 starts a failure information check program for checking for failure information of the devices 3, 4, and 5 to be monitored, and carries out processing in a step S303 to a step S307 for the respective devices 3, 4, and 5 to be monitored, thereby carrying out failure information check processing at time intervals of one minute for example. First, the monitoring apparatus 1 checks for failure information of the devices 3, 4, and 5 to be monitored via the LAN 9 in the step S303. Then, in the step S304, the monitoring apparatus 1 determines whether or not failure information (including failure occurrence time information) has been acquired from any of the devices 3, 4, and 5 based on the result of the checking in the step S303, and the process proceeds to the step S305 if it is determined that failure information has been received.

In the step S305, the monitoring apparatus 1 transmits the failure information (including the failure occurrence time information) acquired as a result of the checking in the step S303 to the host 6. Then, the monitoring apparatus 1 carries out the response check process (FIG. 4) for waiting for a response from the host 6 in the step S306. On the other hand, if the monitoring apparatus 1 determines that failure information has not been received from any of the devices 3, 4, and 5 in the step S304 as a result of the checking in the step S303, the process proceeds to the step S307, where the monitoring apparatus 1 waits for one minute for checking for failure information at time intervals of one minute in the step S307, and then the process returns to the step S303.

After transmitting the failure information to the host 6 in the step S305 in FIG. 3, the monitoring apparatus 1 carries out the response check process which is started in the step S306. The host 6 is configured such that upon receipt of failure information from the monitoring apparatus 1, it transmits information acknowledging the reception of the failure information by e-mail (hereinafter simply referred to as "mail") to the monitoring apparatus 1. In this response check processing, the monitoring apparatus 1 waits for the response from the host 6 for 30 minutes while repeating processing in the following steps S308 to step S310 at time intervals of 30 seconds, for example, and transmits the failure information again to the host 6 only once if the response has not been received in that 30-minute time period. The e-mail function of the monitoring apparatus 1 is used for updating firmware from the host 6 to the monitoring apparatus 1 and for requesting various types of processing.

First, the monitoring apparatus 1 waits for 30 seconds in the step S308 in order to carry out the response check processing at the time intervals of 30 seconds. Then, the monitoring apparatus 1 checks for reception of a mail from the host 6 in the step S309. If as a result of the checking in the step S309, it is determined that the monitoring apparatus 1 has received a mail, and the received mail is a response indicating the reception of the failure information ("YES" in the step 310), the response check process is terminated.

On the other hand, if as a result of the checking in the step S309, it is determined that the monitoring apparatus 1 has not received a mail, or a received mail is not a response indicating the reception of the failure information ("NO" in the step S310), the process returns to the step S308 unless more than 30 minutes have passed since this response check program started, or proceeds to a step S311 otherwise.

In the step S311, the monitoring apparatus 1 determines whether or not the monitoring apparatus 1 has transmitted the failure information once to the host 6. If as a result of this determination, the number of transmissions is not once, namely, the failure information has already been re-transmitted to the host 6, the present process is immediately terminated. In this way, the failure information is re-transmitted only once. On the other hand, if as a result of the determination in the step S311, the number of transmissions is one, namely, the failure information has not been re-transmitted to the host 6 once, the monitoring apparatus 1 re-transmits the failure information to the host 6 in a step S312.

Figure 5:
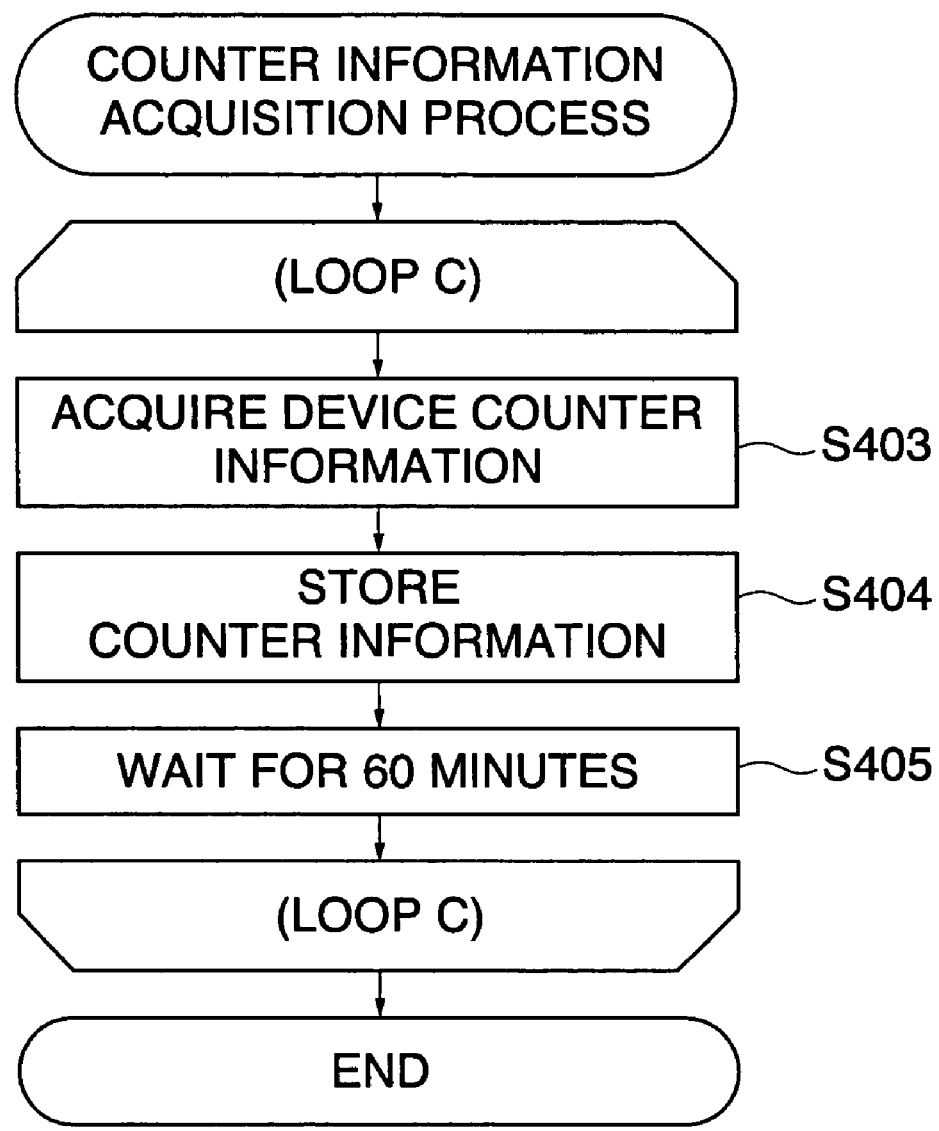
FIG. 5 is a flowchart showing a counter information acquisition process carried out by the monitoring apparatus in FIG. 1.

FIG. 5 is a flowchart showing a counter information acquisition process carried out by the monitoring apparatus 1 in FIG. 1. The process in FIG. 5 is mainly used for determining a charge relating to an image forming apparatus used by a user.

Figure 6:
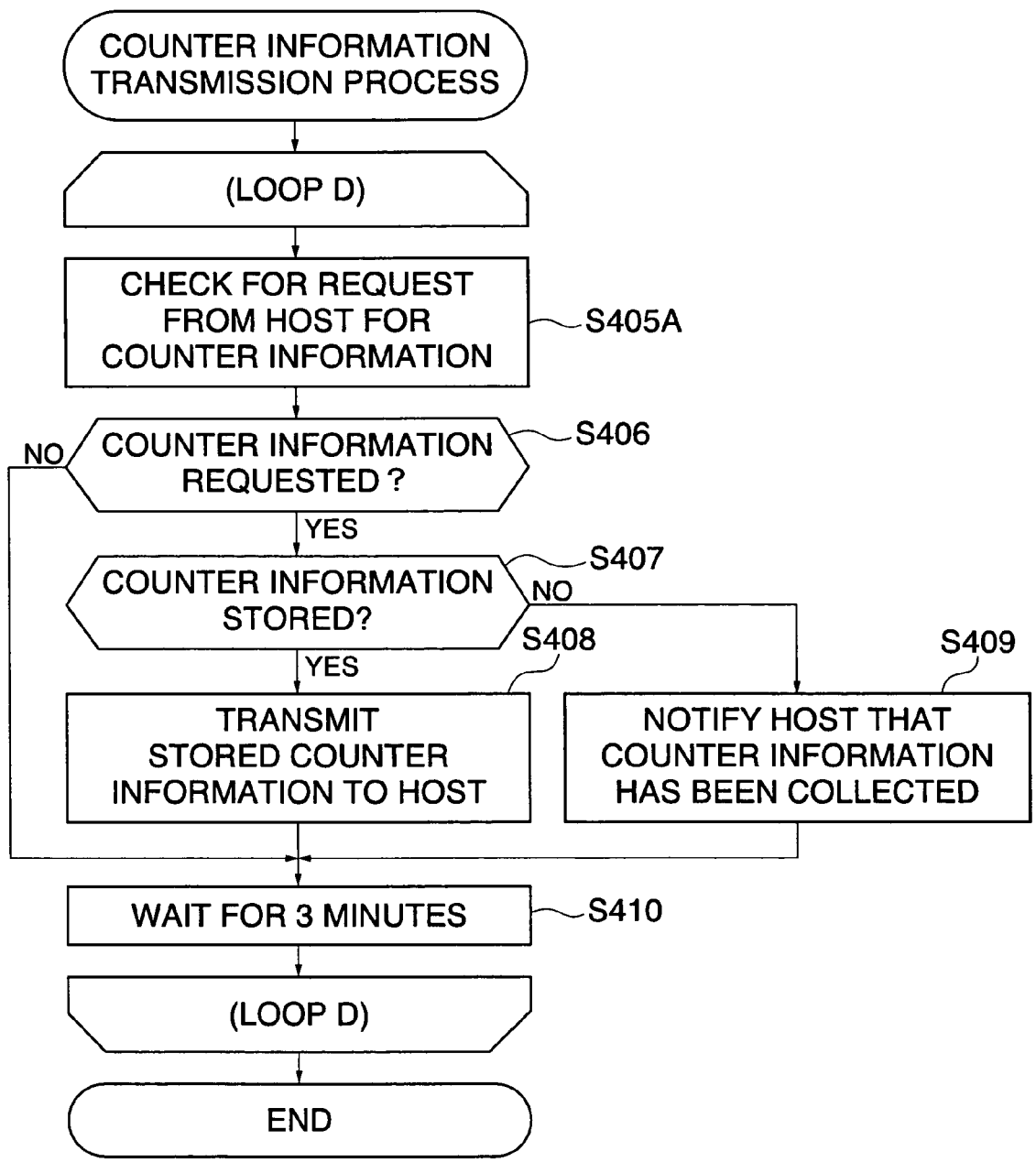
FIG. 6 is a flowchart showing a counter information transmission process carried out by the monitoring apparatus in FIG. 1.

FIG. 6 is a flowchart showing a counter information transmission process carried out by the monitoring apparatus 1 in FIG. 1. The process in FIG. 6 is used when the monitoring apparatus 1 collects counter information from the devices 3, 4, and 5 and the personal computers. The counter information in the present embodiment refers to information including part or all of the above described maintenance information of the devices 3, 4, and 5 and the personal computers, and the processes in FIG. 5 and FIG. 6 are carried out for the respective devices.

In the counter information acquisition process in FIG. 5, the monitoring apparatus 1 starts a counter information acquisition program for acquiring the counter information, to execute the following steps S403 to S405 for the devices 3, 4, and 5 to be monitored at time intervals of 60 minutes, for example, thereby preparing for a request from the host 6 for acquiring the counter information. First, the monitoring apparatus 1 acquires the counter information from each of the devices in the step S403. It should be noted that time information is added to respective device output histories contained in this counter information, and the charge for a predetermined time period (such as one month) is determined based on this time information. Namely, the time information to be added is very important for the determination of the charge billed to a user, and inaccurate time information causes such a problem that an incorrect charge is billed to the user for the predetermined time period. How this time information is correctly managed will be described in various processes, hereinafter described.

Then, in a step S404, the monitoring apparatus 1 stores the counter information acquired from the devices in the step S403 in the flash ROM 204 to prepare for the request from the host 5 for the counter information. On this occasion, if the data format of the counter information acquired from the devices 3, 4, and 5 is different from the data format of the counter information transmitted to the host 6, the data may be converted when the counter information is stored. Alternatively, this data conversion may be carried out when the host 6 requests counter information. In a step S405, the monitoring apparatus 1 then waits for 60 minutes before carrying out similar processing of the acquisition of the counter information 60 minutes later, and then the process returns to the step S403.

The monitoring apparatus 1 starts a counter information transmission program for transmitting the counter information in response to a request from the host 6 for the counter information. The host 6 requests the counter information by transmitting a mail including a counter information request command to the monitoring apparatus 1. This counter information transmission program checks for a mail from the host 6 at time intervals of three minutes, for example, in preparation for a request for the counter information. In the counter information transmission process in FIG. 6, first, in a step S405A the monitoring apparatus 1 checks for a request from the host 6 for the counter information. Then, it is determined whether or not a request for the counter information has been given in a step S406, and the process proceeds to a step S410 if it is determined that the request has not been given. On the other hand, if it is determined that the request for counter information has been given in the step S406, the process proceeds to a step S407.

In a step S407, the monitoring apparatus 1 determines whether or not counter information is stored by the counter information acquisition program in FIG. 5. If it is determined that the counter information is stored, the monitoring apparatus 1 transmits the stored counter information to the host 6 in a step S408. Specifically, histories of the output processing with time information recorded in the devices 3, 4, and 5 is notified to the center via a notification means, and then the process proceeds to the step S410. By execution of the present counter information transmission process, the counter information transmitted from the monitoring apparatus 1 to the host 6 is shared by the center side client PC 7 as described above, and thus, an operator, for example, can refer to the counter information. On the other hand, if it is determined that counter information is not stored in the step S407, the monitoring apparatus 1 notifies the host 6 that the counter information has not been collected (step S409). Then, in the step S410, the monitoring apparatus 1 waits for three minutes, for example, to check for a request from the host 6 for the counter information at time intervals of three minutes.

The device failure information monitoring process described with reference to FIG. 3 and FIG. 4, and the counter information acquisition process described with reference to FIG. 5 and FIG. 6 are thus carried out to remotely and centrally manage the maintenance information from the image forming apparatuses and the personal computers used by the user.

Figure 7:
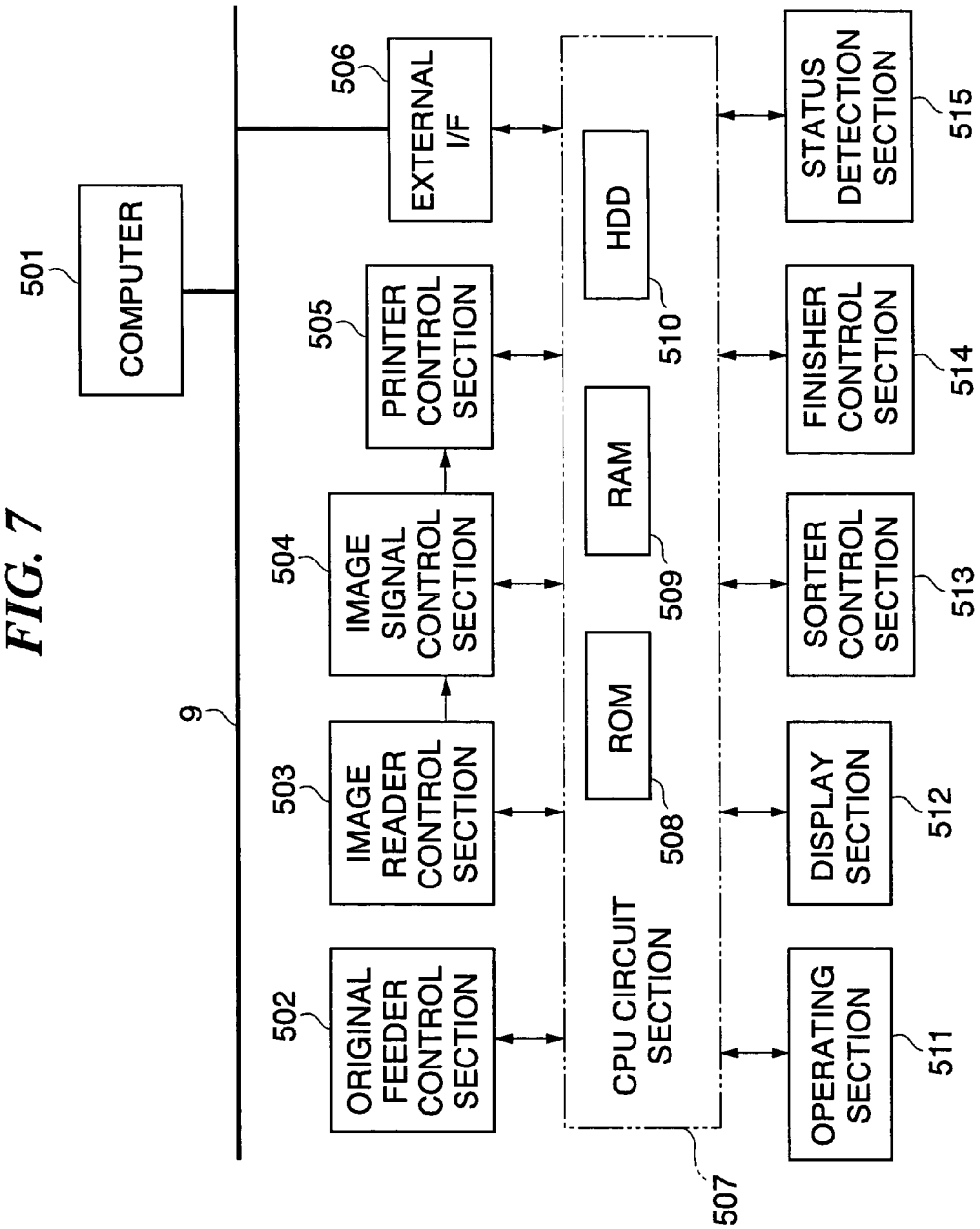
FIG. 7 is a block diagram showing an example of the construction of a controller that controls an entire image forming apparatus which is an example of the devices 3, 4, and 5 in FIG. 1.

FIG. 7 is a block diagram showing an example of the construction of a controller that controls an entire image forming apparatus which is an example of the devices 3, 4, and 5 in FIG. 1.

The controller of the image forming apparatus in FIG. 7 is comprised of an original feeder control section 502, an image reader control section 503, an image signal control section 504, a printer control section 505, an external I/F 506, a CPU circuit section 507, a sorter control section 513, a finisher control section 514, and a status detection section 515. In FIG. 7, reference numeral 511 denotes an operating section of the image forming apparatus, 512, a display section of the image forming apparatus, and 501, the computer connected to the image forming apparatus via the LAN 9.

The CPU circuit section 507 is comprised of a CPU (not shown), a ROM 508, a RAM 509, and a hard disc drive (HDD) 510. The CPU controls the original feeder control section 502, the image reader control section 503, the image signal control section 504, the printer control section 505, the external I/F 506, the operating section 511, the display section 512, the sorter control section 513, the finisher control section 514, and the status detection section 515 in accordance with control programs stored in the ROM 508. The ROM 508 stores the control programs. The RAM 509 temporarily stores control data, and is also used as a working area for calculations required for the control. The hard disk drive 510 stores information required for the control programs, and information received from the original feeder control section 502 to the status detection section 515.

The original feeder control section 502 provides control to drive an original feeder (not shown) which automatically feeds an original set on a original stacking section to an original reading position according to an instruction from the CPU circuit 507. The image reader control section 503 provides control to drive a scanner unit (not shown) which scans an original, an image sensor (not shown) which converts an optical image of the original to an electric signal using optical/electrical conversion, and other like devices, thereby transmitting an analog image signal output from the image sensor to the image signal control section 504. The image signal control section 504 carries out various processing on a digital signal converted from the analog image signal, thereby converting this digital signal to a video signal, and outputs the video signal to the printer control section 505. The processing by the image signal control section 504 is controlled by the CPU control circuit 507.

The external I/F 506 carries out various processing on a digital image signal input from the computer 501 via the LAN 9 and a LAN interface, not shown, thereby converting this digital image signal to a video signal, and outputs the video signal to the printer control section 505. In addition, the external I/F 506 communicates with the monitoring apparatus 1 via the LAN 9 and the LAN interface, not shown. The printer control section 505 drives an exposure controller (not shown) which controls exposure of a photosensitive member based on the input video signal. The operating section 511 includes a plurality of keys for setting various functions relating to the image formation, and a display for displaying information indicating settings, and so forth. The operating section 511 outputs key signals corresponding to operations of the keys to the CPU circuit 507, and displays information corresponding to signals from the CPU circuit 507 on the display section 512.

The sorter control section 513 provides control to drive a sorter mechanism (not shown) for sorting sheets on which images have been formed. The finisher control section 514 provides control to drive a finisher mechanism (not shown) which carries out post processing on sheets, such as punching the sheets, and stapling the sheets) on which images have been formed. The sorter control section 513 and the finisher control section 514 operate based on signals from the CPU circuit section 507 according to inputs from a user via the external I/F 506 or settings input from the operating section 511. The state detection section 515 collects state information from the various locks shown in FIG. 7, carries out detection such as abnormality detection, carries out determinations based on the detection results, and notifies the CPU circuit section 507 of the determination results. According to this notification, the CPU circuit 507 displays abnormalities on the display section 512, and notifies the computer 501 and the like of the abnormalities via the external I/F 506.

Figure 8:
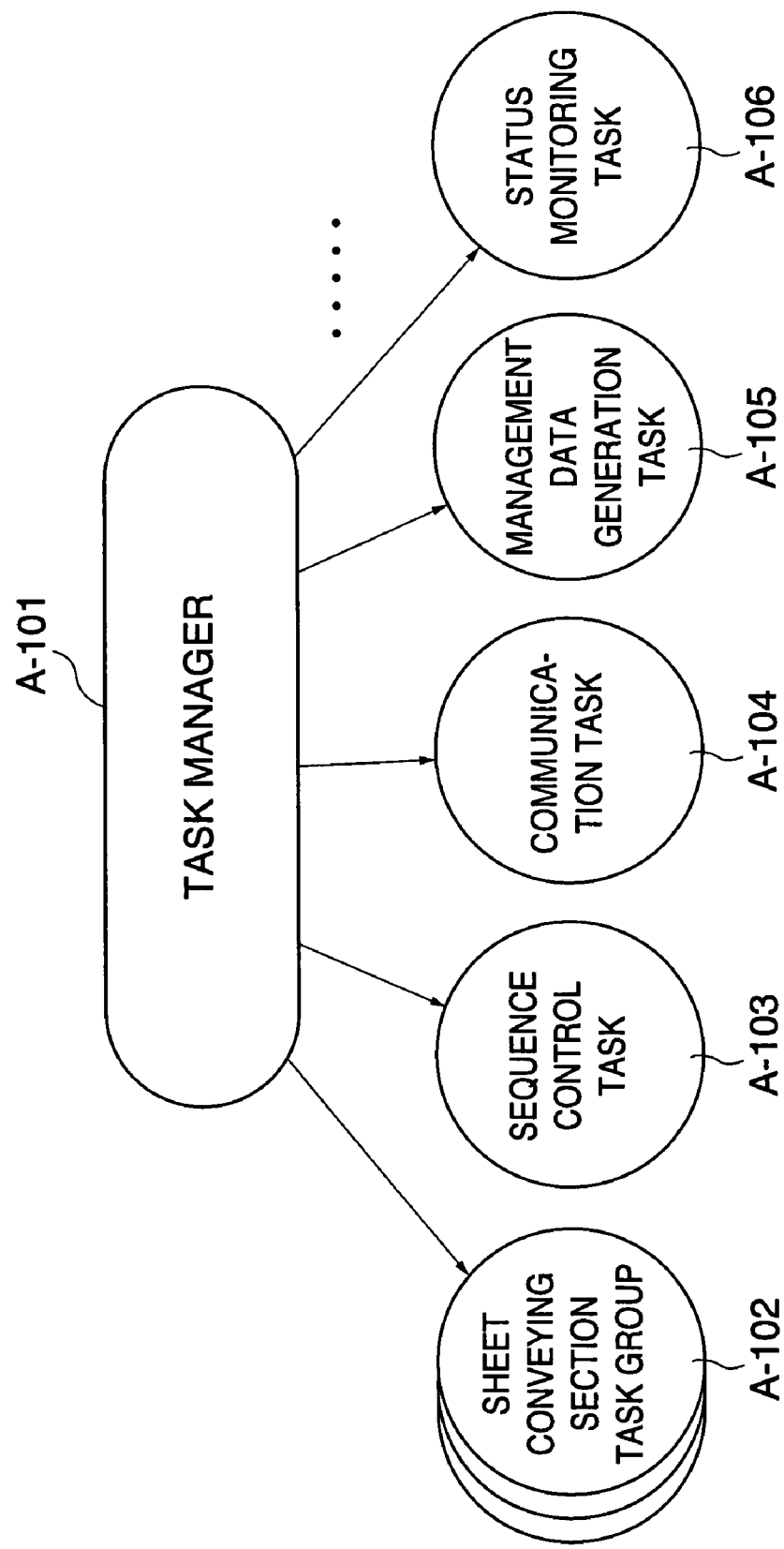
FIG. 8 is a block diagram showing the software construction of the image forming apparatus in FIG. 7.

FIG. 8 is a block diagram showing the software construction of the image forming apparatus in FIG. 7.

The image forming apparatus carries out a task manager A-101, a sheet conveying section task group A-102, a sequence control task A-103, a communication task A-104, a management data generation task A-105, and a status monitoring task A-106.

The task manager A-101 manages a plurality of tasks concurrently. The sheet conveying section task group A-102 is a group of tasks which manage the conveyance of originals and sheets on which images are to be formed. The sequence control task A-103 carries out management of the entire image forming apparatus. The communication task A-104 communicates with the monitoring apparatus 1.

The management data generation task A-105 generates data for the remote management of the present embodiment. The image forming apparatus counts the number of generations of the operation information for each sheet size, each processing mode, each sheet type, and each of black-and-white and color each time image forming processing is carried out. The counting of the number of generations of the operation information is carried out by the management data generation task A-105, and the resulting counts are stored in the hard disk drive 510 of the image forming apparatus. In a similar manner, status information (failure information) relating to states such as jam, error, and alarm is stored in a predetermined data format in the hard disk drive 510 of the image forming apparatus. Further, there are provided counters (component part counters for respective sections of the image forming apparatus, that indicate replacement cycles of consumable components, and degrees of usage of the consumable components, and the counts obtained by execution of the management data generation task A-105 are stored in the hard disk drive 510 of the image forming apparatus.

The status monitoring task A-106 detects abnormalities (jams, errors, and alarms) in the image forming apparatus, or detects status changes in predetermined devices, and when the status monitoring task A-106 detects an abnormality or a status change, status information in a predetermine format is stored in the hard disk drive 510 of the image forming apparatus.

The basic construction of the present invention is described above. The information processing apparatus such as the above described monitoring apparatus 1 can acquire time information from the host 6 using various time acquisition programs such as a program using NTP or RSYNC.

The provision of a dedicated time acquisition program (NTP program) for acquiring information of the present time is less expensive than the provision of a battery in the monitoring apparatus 1, but this requires the provision of a dedicated server 6 which provides information on the present time and which is guaranteed to constantly properly operate, in the LAN 9 to which the monitoring apparatus 1 is connected. On the other hand, the use of an infrastructure of an external network to acquire the present time requires that a port used by this dedicate time acquisition program should not be blocked by a firewall or the like in the environment where the monitoring apparatus 1 is used. However, this requirement cannot be implemented in an environment where strict security is required, and thus limits the environment where the apparatus can be used, and hence significantly impairs the versatility of the apparatus. Therefore, the monitoring apparatus 1 according to the present embodiment can also set/correct time using an e-mail for communication with an external apparatus.

RFC (Request For Comments)—2821 describes the specifications of the SMTP protocol used for e-mails. The specifications contain the following essential functions of e-mail servers.

Namely, it is stipulated that upon receipt of a mail transmitted from an end client or another mail server, the mail server should add a "Received" tag as path information to header information of the mail to be transferred. It is also stipulated that the "Received" tag should contain the address of the sender of the transmitted mail, and the time when this mail is transferred. Further, RFC also specifies the format of the time information.

Thus, if a sender transmits a mail to its own address and receives the mail, the mail has header information with the above additional header information added by the mail server, which contains the time at which the mail was received by the mail server.

Further, the time acquired from a clock integrated into the information processing apparatus is also added to the body of the mail so as to be able to clearly grasp the time of transmission of the mail. This added time may largely deviate from the actual time if the information processing apparatus has been reset due to turning-on/off of the main power supply.

The time information obtained from the "Received" tag upon receipt of this mail indicates the time when the—mail server received the mail, and it can be deemed that this time of the reception approximately coincides with the time when the information processing apparatus transmitted the mail. Therefore, by obtaining the difference between the time of transmission of the mail and the time in the "Received tag", a time difference between the information processing apparatus and according to the mail server can be determined, and if time setting is carried out for the information processing apparatus with this time difference taken into account, the time set for the information processing apparatus can be approximately the same as the set time of the mail server. Although the difference of the set time from the actual time depends on the accuracy of the set time of the mail server, it can be considered that the set time of the mail server which is an important infrastructure is not excessively inaccurate, and therefore, in an environment where the same network infrastructure is used, it can be considered that sufficient time accuracy can be obtained.

A further detailed description will now be given of the mechanism in the remote management system which calculates an effective time limit of maintenance using a failure prediction means according to the present invention, and manages a maintenance schedule according to the calculated time limit. The information processing apparatus in this remote management system has a time acquisition function of acquiring time information without using the above described dedicated program for acquiring the present time.

Acquisition of the time information and setting of the present time using the transmission/reception of a mail by the monitoring apparatus 1 (information processing apparatus) described below is carried out upon resetting of the information processing apparatus due to turning-on/off of the power supply, and is periodically carried out by a clock means.

Figure 9:
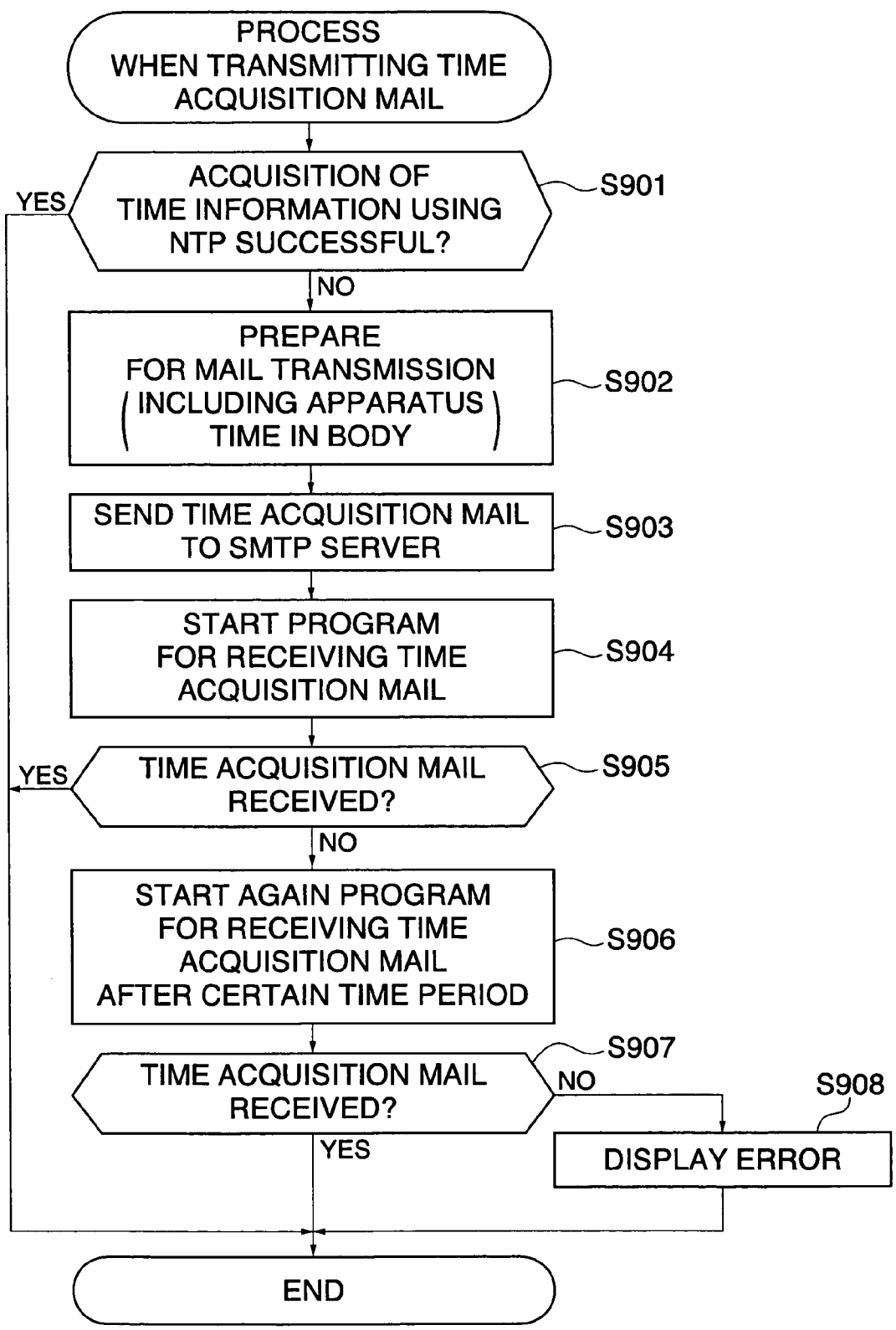
FIG. 9 is a flowchart showing a process carried out by the monitoring apparatus in FIG. 1 when transmitting a time acquisition mail.

FIG. 9 is a flowchart showing a process carried out by the monitoring apparatus 1 in FIG. 1 when transmitting a time acquisition mail.

The process of FIG. 9 includes acquisition of time by NTP and acquisition of time by the time acquisition mail.

First, it is determined whether or not the acquisition of the time information by NTP was successful (step S901). If the acquisition failed, preparations are made for transmission of a time acquisition mail (step S902). If the acquisition using NTP failed, it is considered that this failure has occurred for one of the following reasons: A dedicated server which provides the present time information and which is guaranteed to constantly properly operate is not available under the network environment, or the port used by NTP is blocked by a firewall or the like so that the time information cannot be obtained from an external apparatus as described above. It should be noted that if the information processing apparatus does not have the time setting function using NTP, and carries out only processing in the step S902 and subsequent steps, the apparatus can be realized at a lower cost.

Moreover, if the processing in the step S901 is carried out after execution of steps S902 to S908, so that the acquisition of the time information by NTP and the time setting by e-mail are carried out concurrently, at least a communication test for determining whether or not the e-mail transmission function is normal can be carried out by determining whether or not time setting by e-mail can be properly carried out, whereby the efficiency of the monitoring apparatus 1 can be enhanced.

In the step S902, the monitoring apparatus 1 is caused to designate itself as the destination of the time acquisition mail, and sets the title ("Subject") of the mail, as identification information which allows the mail to be easily distinguished as a mail for time acquisition, for example, a combination of a character string such as "Time Adjust Mail," and a number (such as a process number) unique to the time acquisition mail. Also, the time when the information processing apparatus prepares the time acquisition mail addressed to itself is described in the body of this time acquisition mail. When a more precise time is required, it is preferable to acquire time inside the information processing apparatus during communication with the SMTP server, and then includes the acquired time in the body of the e-mail to be transmitted. The mail is transmitted immediately after the preparation is completed (step S903).

Upon completion of the transmission, a program for receiving the time acquisition mail is started (step S904). In the case where an SMTP server and a POP server are not running on the same server, the time acquisition mail may not reach the POP server immediately after the transmission, and thus it is determined whether or not the time acquisition mail has been received (step S905), and if it is determined that the time acquisition mail has not been received, the program for receiving the time acquisition mail is started again after the lapse of a certain time period (step S906). Then, the determination whether the time acquisition mail has been received is repeated once or a predetermined number of times (step S907). If the time acquisition mail has not been received even after the repeated determination(s), it can be considered that the mail has been lost for some reason, and a notice of the error is displayed on the display section of the information processing apparatus, or on a portable terminal (second information processing apparatus) with which the present information processing apparatus can communicate (step S908), followed by the present process being terminated. On the other hand, it is determined that the time acquisition mail has been received in the step S907, the present process is immediately terminated.

Figure 10:
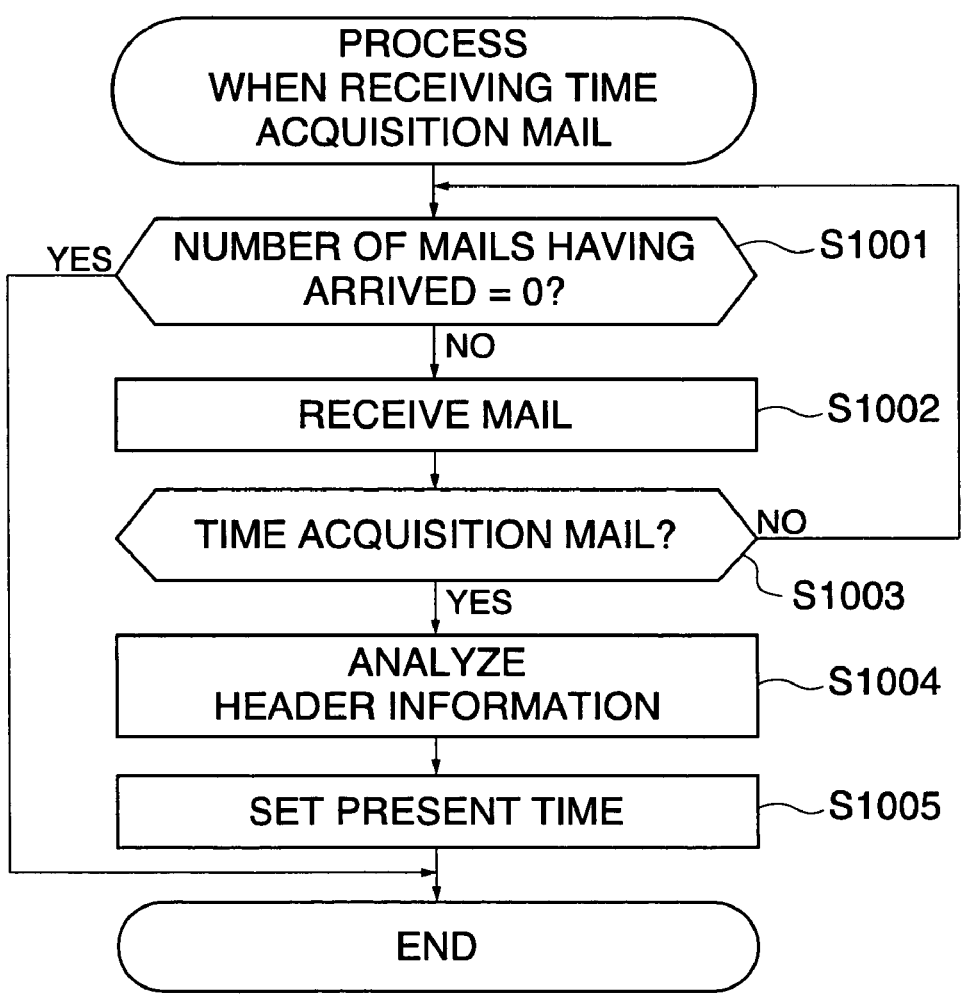
FIG. 10 is a flowchart showing process carried out by the monitoring apparatus in FIG. 1 when receiving the time acquisition mail.

FIG. 10 is a flowchart showing a process carried out by the monitoring apparatus 1 in FIG. 1 when receiving a time acquisition mail.

In the present embodiment, a description will be given of a case where the monitoring apparatus 1 accesses the POP server. First, the monitoring apparatus 1 connects to the POP server, and checks whether or not the number of mails that have arrived at the POP server is 0 (step S1001). It should be noted that the POP server may not be dedicated to acquisition of the time acquisition mail, and hence mails other than time acquisition mails may have arrived at the POP server, and the present process for receiving a time acquisition mail does not process these unrelated mails.

If it is determined that the number of mails having arrived is not 0 ("NO" to the step S1001), namely, one or more mails have arrived, the monitoring apparatus 1 receives the mail(s) (step S1002). Then, the monitoring apparatus 1 determines whether or not the received mail(s) is(are) the time acquisition mail(s) addressed to itself (step S1003). This determination is carried out based on the sender and the identification information such as the title ("Subject") of the received mail (s). Since the title includes the number unique to the mail, it is also possible to determine whether or not the received mail(s) are the same as a mail or mails that was(were) received before the present received mail(s).

The header information of each received mail is analyzed (step S1004). In this analysis, "Received" tag information is obtained from the header information of the mail. The "Received" tag has the following format which describes a path ("bar.com" or "foo.com") along which the mail has been transferred:

Received: from bar.com by foo.com; Thus, 21 May 1998 05:33:29 .+0900

The time when the SMTP server received the mail is contained at the end of the tag. Particularly, if an e-mail whose body contains present time C counted by a timer of the present information processing apparatus is transmitted during a session with the SMTP server, time B when the SMTP server receives the mail (mail reception time B) and the time C are deemed to be approximately the same as actual time A when the mail whose body contains the time C is transmitted, that is, the following relationship holds:

> Actual time A=Time when the SMTP records time B
> =Time when the information processing apparatus records the time C Therefore, the difference between the time C described in the mail body, and the time B obtained from the "Received" tag which indicates the time when the SMTP server received the mail is the difference between the time counted by the timer of the present information processing apparatus and the time when the mail was received by the SMTP server. The present time of the information processing apparatus is set by correcting the present time of the information processing apparatus based on the transmission time C of a mail addressed to itself (hereinafter referred to as "the self-addressed mail") and the time B of reception of the mail by the server (step S1005).

As a further application, based on the above difference and time D when a time acquisition mail is received in the step S905 of the FIG. 9 flowchart, the present time of the information processing apparatus may be corrected in the step S1005.

For example, assuming that the time C of transmission of the self-addressed mail by the information processing apparatus is 14:00, the time B of reception of this mail by the SMTP server is 14:30, and the time D of reception of the time acquisition mail is 14:05, the corrected present time is 14:05+(14:30-14:00)=14:35. In this way, the present time set in the information processing apparatus can be made approximately equal to the present time set in the SMTP server.

Conventional time acquisition methods using an e-mail include a method in which a mail is transmitted to a specific mail address, and then time information is contained in the body of a replay mail to the mail. This method, however, has such a problem that some time period is required for creating the replay mail and there occurs a time lag because the mail is transferred via a plurality of SMTP servers on the Internet. Therefore, even if a mail server for the specific mail address returns the replay mail whose body contains accurate time information to the mail sender, there is a time delay before the return mail is actually received, and further, the delay amount varies. Therefore, if the time information contained in the mail body is used as it is by the recipient, accurate time information cannot be obtained. The time setting of the information processing apparatus based on the difference between the time C and the time B, and the time D solves this problem, and sets the present time more accurately using the e-mail program without a dedicated time acquisition program.

As described above, according to the information processing apparatus of the present embodiment, it is possible to acquire time and set the present time without using special hardware and without a special server or infrastructure for acquiring time, whereby processing can be carried out according to a schedule set based on time.

In a communication environment in which the monitoring apparatus 1 manages various information for image forming apparatuses of users, a firewall may be provided for security. In this case, there is a possibility that the monitoring apparatus 1 cannot be easily accessed from an external apparatus such as the host 6. An effective countermeasure for this is to make a request for carrying out processing from the external apparatus using an e-mail. If the monitoring apparatus 1 placed under this communication environment has an e-mail function, time setting can be effectively carried out using this e-mail function.

A description will now be given of a second embodiment of the present invention.

While in the above described first embodiment, the processes of the flowcharts in FIG. 9 and FIG. 10 are carried out by the monitoring apparatus 1, the second embodiment is different from the first embodiment in that the processes of the flowcharts in FIG. 9 and FIG. 10 are carried out by any of the devices 3, 4, and 5 as image forming apparatuses having a printing section that carries out printing on a recording medium.

In the present embodiment, the failure information check process in FIG. 3 and the counter information acquisition process in FIG. 5 are carried out such that any of the devices 3, 4, and 5 monitors failure occurring in itself and a counter provided in itself, and responds to and checks requests shown in FIGS. 4 and 6 from the host 6.

If only one device exists in the device remote monitoring system, by thus providing functions of the first embodiment described above for the device, it is not necessary to provide the monitoring apparatus 1.

A description will now be given of a third embodiment of the present invention.

Although in the first and second embodiments, the time setting is carried out upon reset of the information processing apparatus (monitoring apparatus 1) due to turning-on/off of the power supply and is periodically carried out by the clock means, the third embodiment is different in that the processes of the flowcharts in FIG. 9 and in FIG. 10 are carried out according to the timing of execution of the processes of the flowcharts in the FIG. 3 through FIG. 6. By doing so, an ideal monitoring apparatus 1 and an ideal device remote monitoring system are realized. For example, if time is set in timing intermediate between timing of collection of the counter information at the present time and timing of collection of the counter information at the next time, the collection of the counter information and the time setting can never overlap in execution timing, leading to enhanced reliability of the monitoring apparatus 1.

A description will now be given of a fourth embodiment of the present invention.

In the fourth embodiment, as in the above described embodiments, the monitoring apparatus 1 (information processing apparatus) does not have an RTC. The present embodiment is different in that, in the case of automatic startup of the information processing apparatus or the like, the present time is stored before the power supply to the information processing apparatus is turned off, and time is then set using the stored time information upon the next startup of the information processing apparatus.

Figure 11:
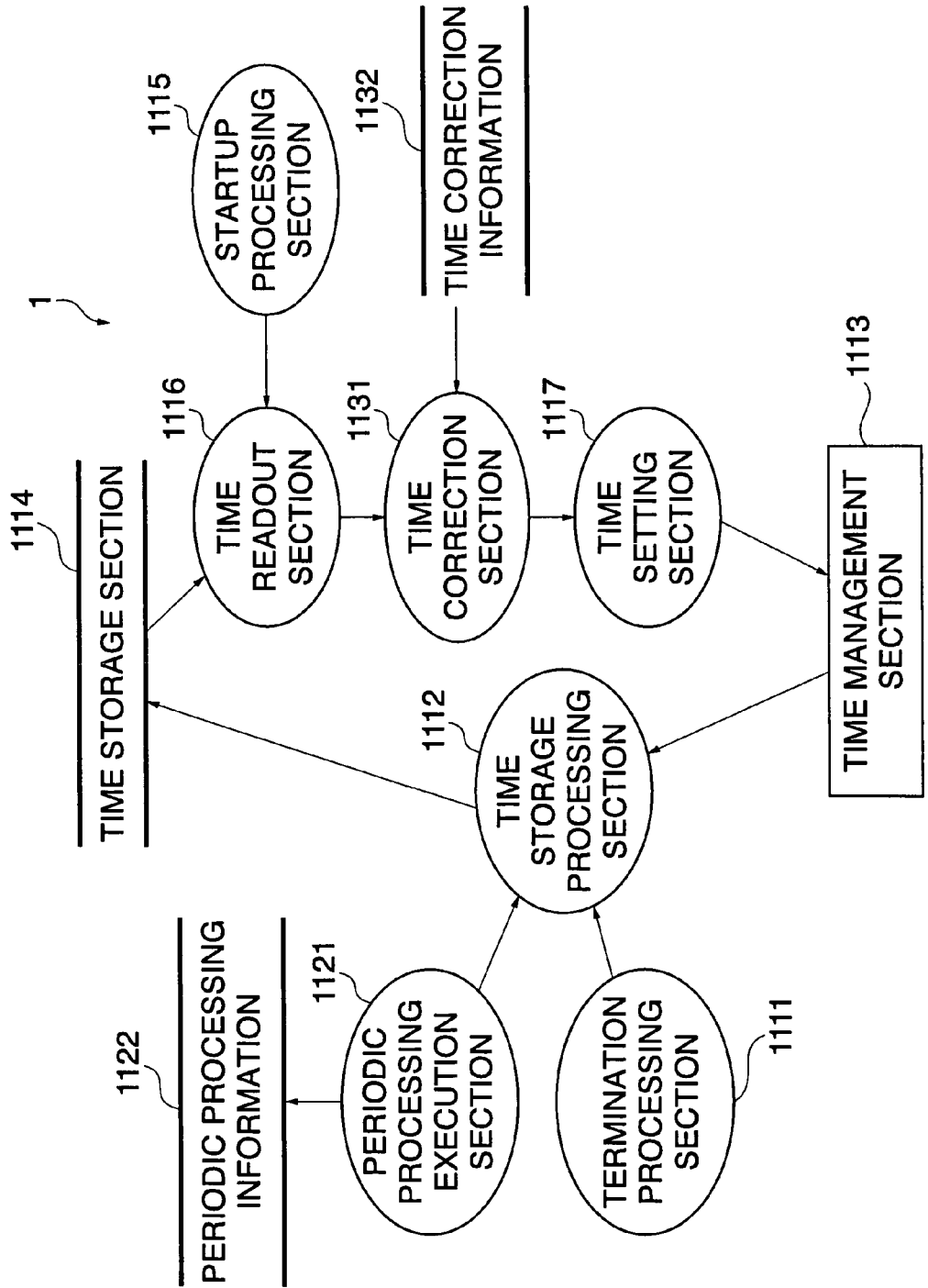
FIG. 11 is a view showing the construction of a monitoring apparatus as an information processing apparatus according to a fourth embodiment of the present invention.

FIG. 11 is a view showing the construction of the information processing apparatus (monitoring apparatus 1) according to the fourth embodiment, and particularly showing the construction of the time setting function (time setting means) of the monitoring apparatus 1. It should be noted that the time setting function (time setting section) in FIG. 11 includes the functions described above with reference to the flowcharts in FIGS. 9 and 10, but illustration of these functions is omitted for the sake of simplicity.

FIG. 11 also shows the constructions of information processing apparatuses according to fifth and sixth embodiments, described below.

Reference numeral 1111 denotes a termination processing section of the monitoring apparatus 1, which constitutes the fourth embodiment. Reference numeral 1112 denotes a time storage processing section, and reference numeral 1113 denotes a time management section 1113. The time storage processing section 1112 and the time management section 1113 acquire and update time for backup by predetermined processing such as processing using NTP in a step S1305, and mail processing in steps S1306 to S1311 in FIG. 13B, described later. The acquisition and update are carried out periodically or immediately before a reboot, for example. Reference numeral 1114 denotes a time storage section; 1115, a startup processing section; 1116, a time readout section; and 1117, a time setting section. The present embodiment does not have a time correction unit 1131, and information from the time readout section 1116 is directly transmitted to the time setting section 1117.

Figure 12:
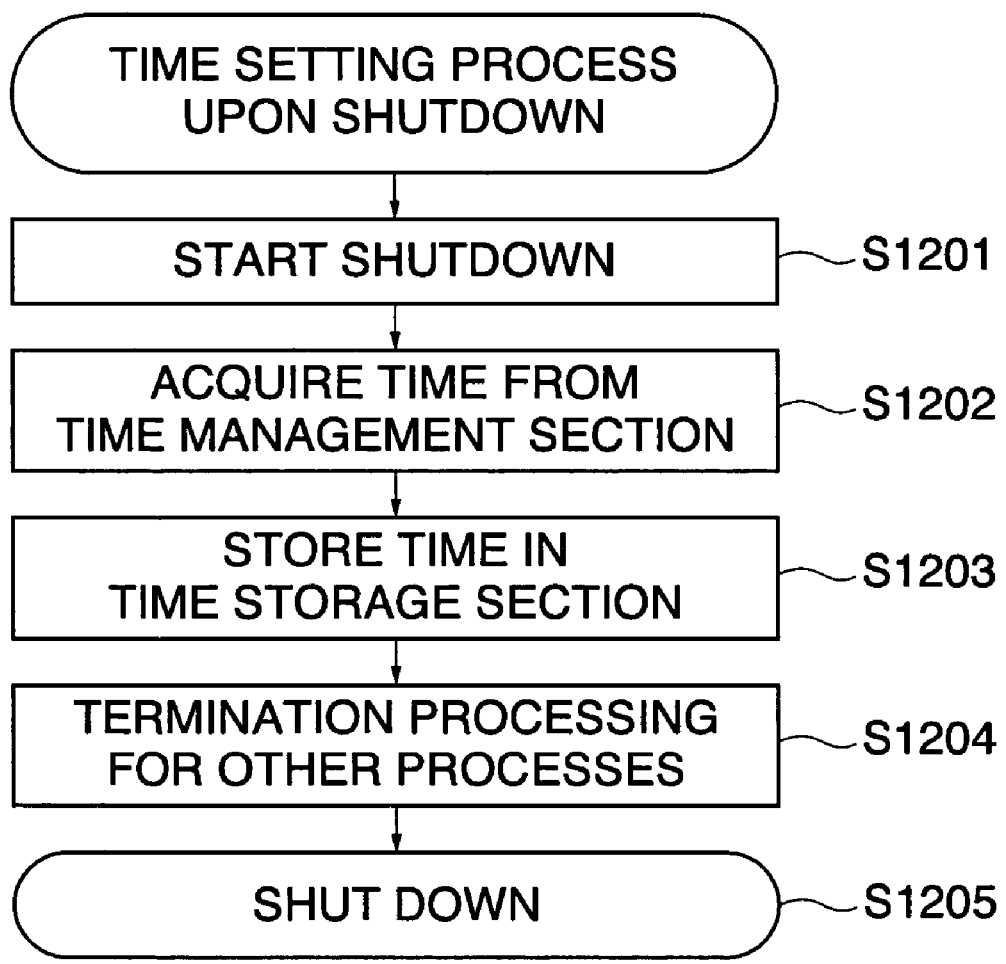
FIG. 12 is a flowchart of a time setting process carried out by the monitoring apparatus upon shutdown (turning-off of the power supply), according to the fourth embodiment.

FIG. 12 is a flowchart of a time setting process carried out by the monitoring apparatus 1 upon shutdown (turning-off of the power supply) according to the fourth embodiment. The processing in the flowchart in FIG. 12 is executed when the power supply is forcibly turned off and then turned on, and immediately before automatic and periodic reboot processing by the monitoring apparatus 1 (information processing apparatus) is executed.

First, when shutdown processing starts in a step S1201, the termination processing section 1111 carries out termination processing for terminating the operation of the information processing apparatus, and calls the time storage processing section 1112.

Then, the time storage processing section 1112 obtains the present time from the time management section 1113 (step S1202). The time storage processing section 1112 writes the obtained present time in the time storage section 1114 for storage (step S1203). Then, the termination processing section 1111 carries out termination processing for other processes (step S1204), finally shuts down the system (step S1205), and terminates the present process.

In addition, the processing in the step S1202 and S1203 may be carried out at regular time intervals (e.g. one hour). This can reduce an error in the time set in steps S1302 and S1303, described later.

Figure 13A:
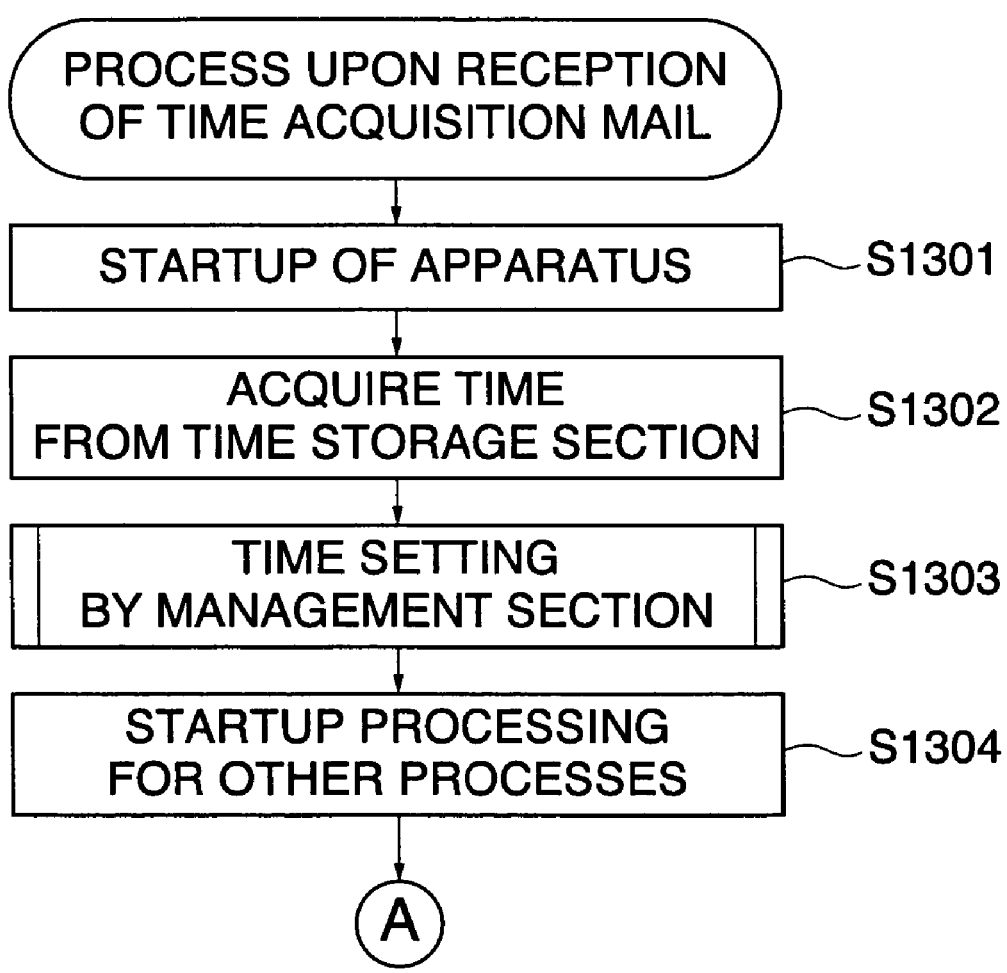
FIGS. 13A and 13B are flowchart of a time overwrite process carried out by the monitoring apparatus when receiving the time acquisition mail according to the fourth embodiment.
Figure 13B:
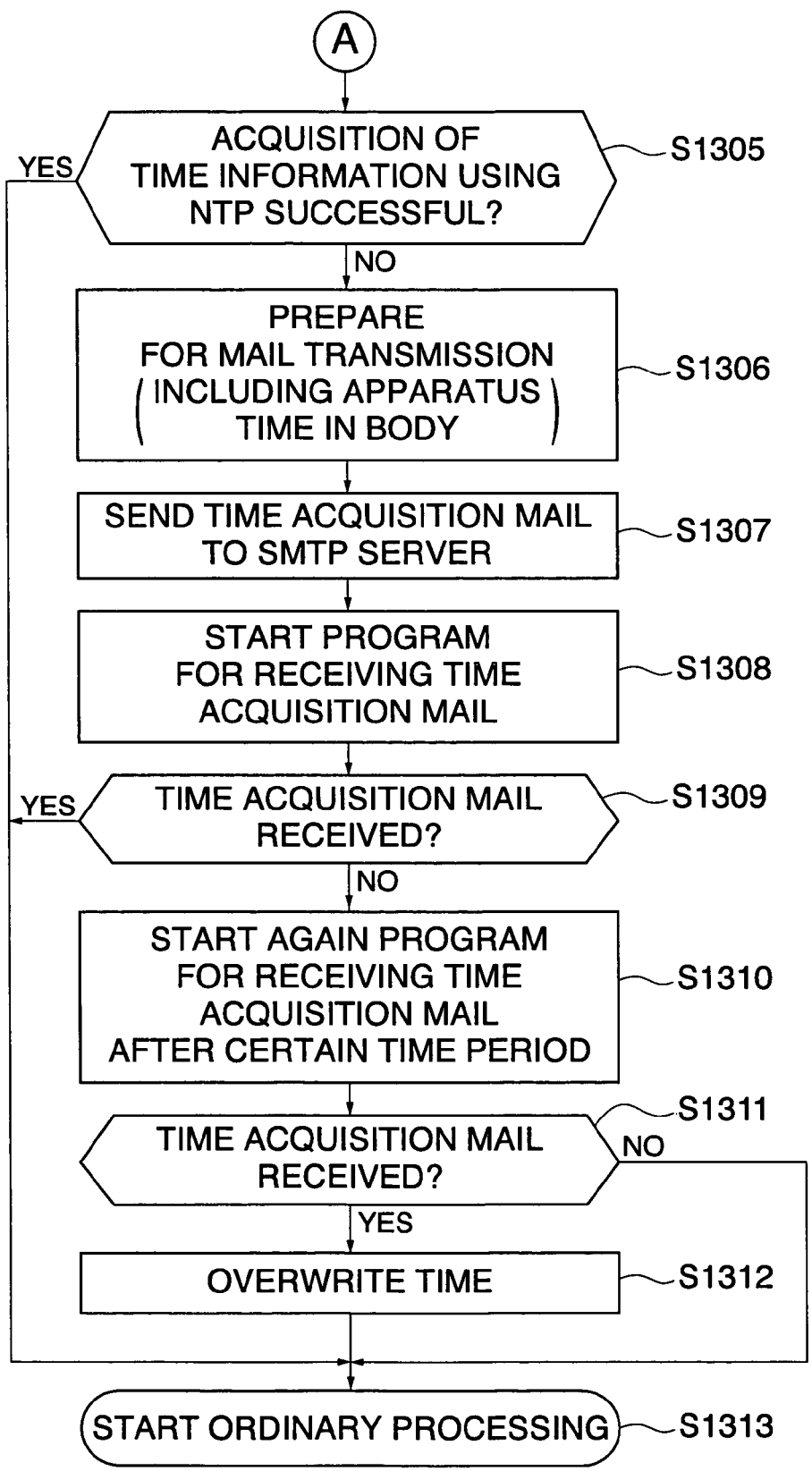

FIGS. 13A and 13B are flowchart of a process carried out upon reception of a time acquisition mail according to the fourth embodiment. The process of FIGS. 13A and 13B may be carried out synchronously or asynchronously with the processing in the flowchart in FIG. 12. The process of FIGS. 13A and 13B is carried out upon automatic reboot or upon resumption of the power supply after turning-off for a predetermined cause.

First, when the power supply of the monitoring apparatus 1 is turned on, the monitoring apparatus 1 starts up to start the process of FIGS. 13A and 13B in a step S1301.

Then, the startup processing section 1115 calls the time readout section 1116, and the time readout section 1116 obtains the time information which was stored in the time storage section 1114 in the step S1203 in the flowchart in FIG. 12 (step S1302).

Then, to cause the time setting section 1117 to set time based on the time information stored in the time storage section 1114 (retaining section) upon startup of the monitoring apparatus 1, the time readout section 1116 passes the obtained time information to the time setting section 1117, and the time setting section 1117 changes and sets time in the time management section 1113 using this time information (step S1303). Then, startup processing for other processes is carried out (step S1304).

Then, processing in steps S1305 et seq. are carried out. Processing in the step S1305 to a step S1310 are identical with the processing in the steps S901 to S906 in the flowchart in FIG. 9, and hence description thereof is omitted.

In a step S1311, it is determined whether or not a self-addressed mail transmitted by the processing from the steps S1305 to S1310 has been normally received. If the time acquisition mail has not been received, this means that the mail has been lost for some cause such as failure of the e-mail server, ordinary processing is started (step S1313).

If it is determined in the step S1311 that the time acquisition mail has been received, the time in the mail is overwritten on the time stored in the steps S1302 and S1303 in the step S1312, and the ordinary processing is started (step S1313). In this way, according to the time setting function in FIGS. 13A and 13B, upon the start of the monitoring apparatus 1, the present time is set based on the time retained in the time storage section 1114, and then the time acquired by the time setting using the e mail or NTP is overwritten on the set present time. Therefore, more accurate time setting is preferentially used, and at the same time, even if the time setting using the e-mail or NTP fails, it is possible to positively prevent time setting from having a large error.

FIG. 14 shows an example of the time information stored in the time storage section 1114 in FIG. 11, and this time information corresponds to the information referred to in the above described step S1302.

In this example, upon acquiring time of "1:31 PM, Oct. 10, 2003" from the time management unit 1113, the time storage processing unit 1112 retains time information "101013312003." An information file containing this information itself functions as a program. When the time readout section 1116 executes this file, this file itself operates as the time setting section 1117, to set the time to the time management section 1113.

Although in the present embodiment the example where the information file itself is executed as a program is shown, the information file itself may contain only the time information, and the time setting section 1117 may be an independent program executed by the monitoring apparatus 1 to set the present time to the time management section 1113 based on the above time information.

A description will now be given of a fifth embodiment of the present invention.

While the construction of the fourth embodiment described above is comprised of the sections denoted by reference numerals 1112 to 1117 in FIG. 11, the present embodiment is different from the fourth embodiment in that the construction of the present embodiment further comprises additional sections denoted by reference numerals 1121 and 1122.

Reference numeral 1121 denotes a periodic processing execution section. Reference numeral 1122 denotes periodic processing information used by the periodic processing execution section 1121.

Figure 15:
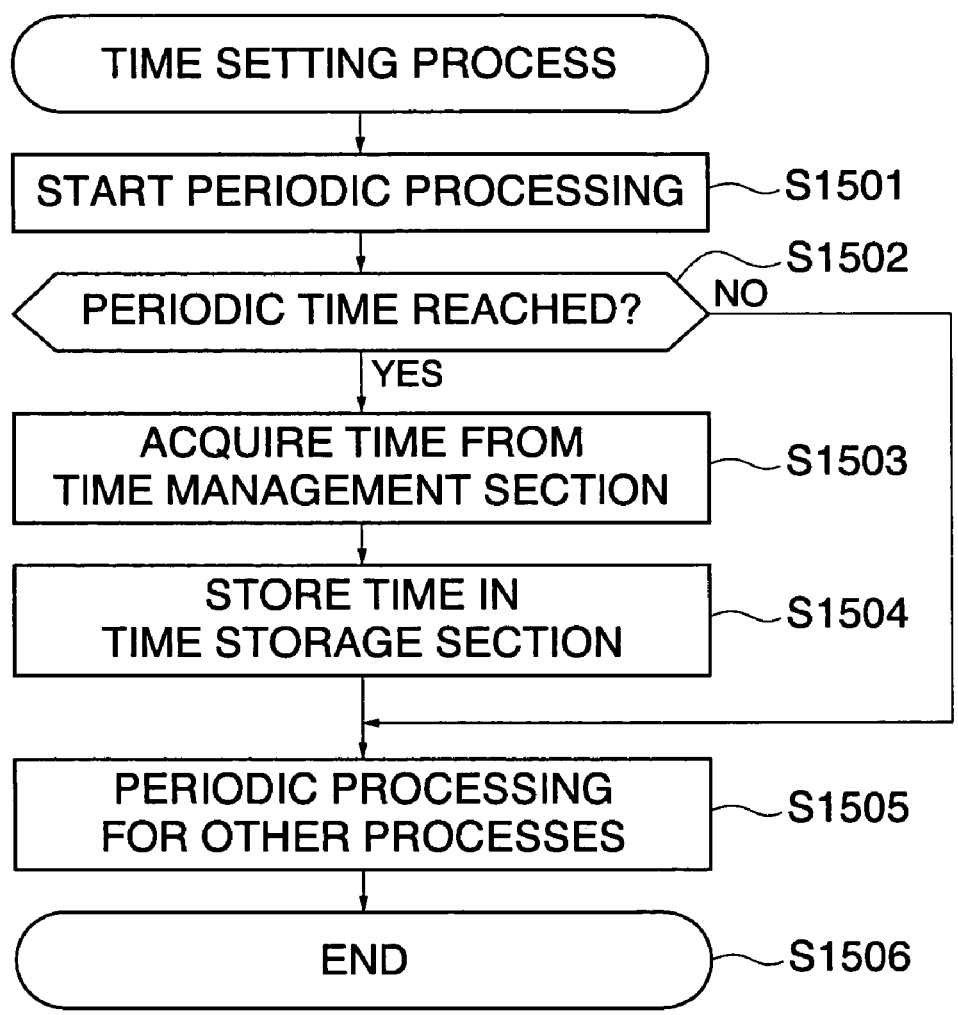
FIG. 15 is a flowchart of a time setting process according to a fifth embodiment of the present invention.

FIG. 15 is a flowchart of a time setting process according to the fifth embodiment. The process in the flowchart in FIG. 15 is executed when the power is supplied from an external power source to the monitoring apparatus 1, for example, when a battery is not provided in the apparatus.

When time when periodic processing is to be executed has been reached, the periodic processing execution section 1121 starts periodic processing (step S1501). In a step S1502, the periodic processing execution section 1121 refers to the periodic processing information 1122, and determines whether or not periodic time when the time storage processing section 1112 is to be called has been reached, namely the present time is time storage timing.

If the present time is the time storage timing of the time storage processing section 1112, the time storage processing section 1112 is called. Then, the time storage processing section 1112 obtains the present time from the time management section 1113 (step S1503).

The time storage processing section 1112 then writes the obtained present time in the time storage section 1114 for storage (step S1504).

On the other hand, it is determined that the present time is not the time storage timing in the step S1502, the time setting processing directly proceeds to a step S1505.

Then, whether or not periodic processing for other processes is to be carried out is checked and the periodic processing is carried out (step S1505), and the periodic processing is terminated (step S1506). In the present embodiment, the time setting upon startup is identical with that of the first embodiment.

FIG. 16 is a view showing an example of the periodic processing information retained in the periodic processing execution section 1121 in FIG. 11.

In FIG. 16, it is shown that "/var/tmp/backup_date.sh" operates at one minute past x o'clock every hour, /var/tmp/daily operates at 4:02 AM everyday, and /var/tmp/weekly operates at 7:00 AM every Sunday. The periodic processing execution section 1121 reads this information, compares the information with the time acquired from the remote management system, not illustrated, and carries out processing based on the acquired time. In this example, the processing of "/var/tmp/backup_date.sh" is carried out by the time storage processing section 1112.

Although in the present embodiment, the periodic processing execution section 1121 determines whether or not periodic processing is to be executed by comparing the time contained in the periodic processing information with the present time (step S1502), this determination may be carried out based on time elapsed from the immediately preceding periodic processing. In this case, the periodic processing execution section 1121 has a means for retaining time of execution of the immediately preceding periodic processing.

As described above, according to the fifth embodiment, the time setting processing is periodically carried out, the time set in the above described steps S1302 and S1303 has a smaller error from the actual time, compared with a case where the time stored in the time storage section 1114 is not updated.

A description will now be given of a sixth embodiment of the present invention.

In the fourth and fifth embodiments described above, the time retained in the time management section 1113 is used directly as the time upon the next startup. However, in the case of a restart such as a reboot carried out for stable system operation, there occurs an error corresponding to a time period required for reboot processing. In the sixth embodiment, a correction is made of the error in the time period from immediately before the start of the reboot when the time is stored for the retention to completion of the reboot.

The present embodiment has a construction which is further includes sections denoted by reference numerals 1131 and 1132 in addition to the construction of the fifth embodiment in FIG. 11.

Reference numeral 1131 denotes a time correction section, and reference numeral 1132 denotes time correction information used by the time correction section 1131.

Figure 17:
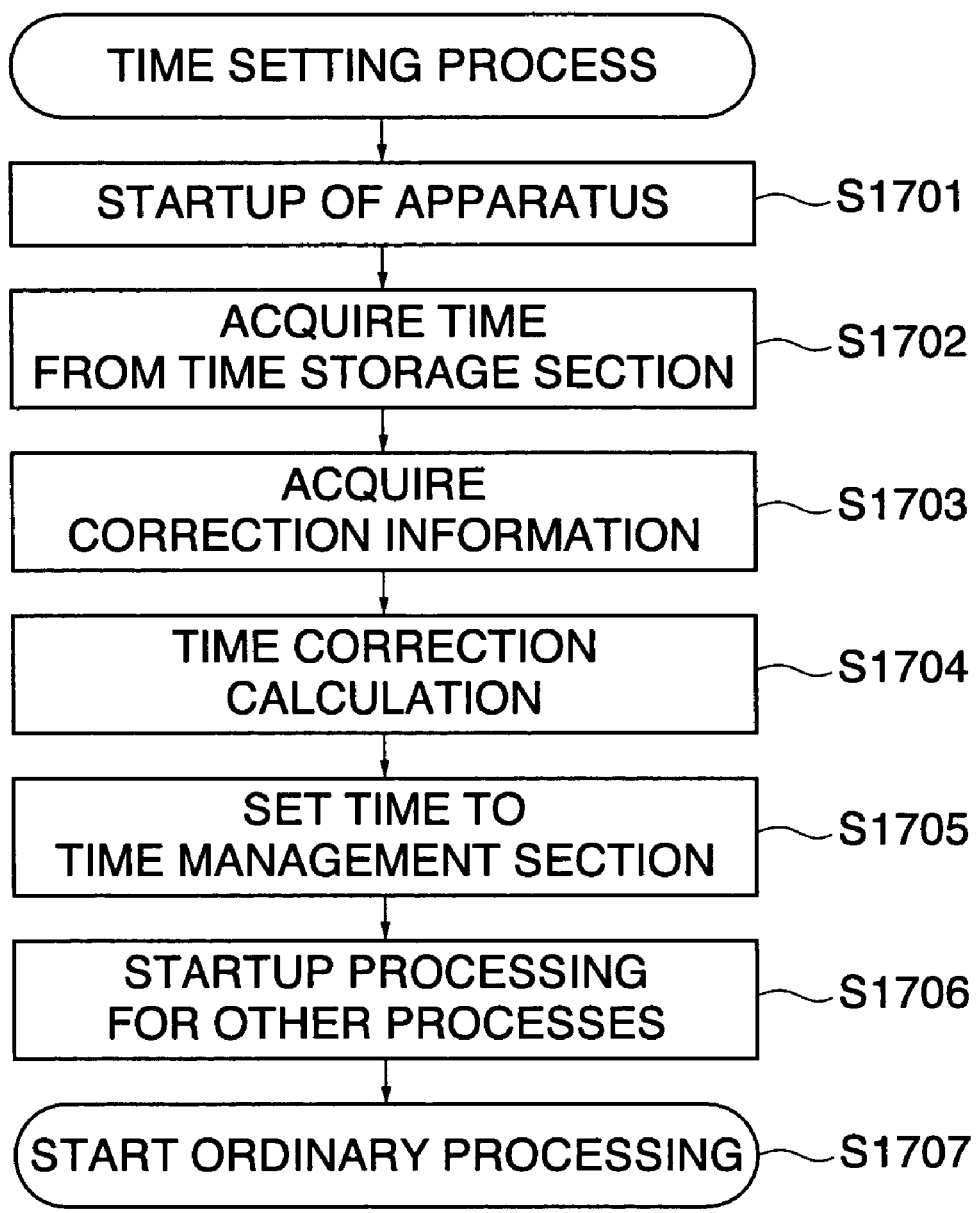
FIG. 17 is a flowchart of a time setting process according to a sixth embodiment of the present invention.

FIG. 17 is a flowchart of a time setting process according to the sixth embodiment.

When the power is turned on at the start of the reboot, startup of the monitoring apparatus 1 is initiated (step S1701), the startup processing section 1115 calls the time readout section 1116, and the time readout section 1116 obtains the time information stored in the time storage section 1114 (step S1702). The time information obtained in the step S1702 corresponds to the time information stored by the processing in the step S1203 in FIG. 12 before the reboot.

The time readout section 1116 passes the obtained time information to the time correction section 1131, and the time correction section 1131 obtains predetermined correction information used for the correction of the time from the time correction information 1132 (step S1703). This predetermined correction information can correct the time retained in the time storage section 1114 to a more precise time.

The time correction section 1131 carries out time correction calculation and corrects the time information based on the predetermined correction information (e.g. information on a time period required for execution of a reboot)(step S1704), and passes the corrected time information to the time setting section 1117. Having received the corrected time information, the time setting section 1117 corrects the time in the time management section 1113 to a correct time based on the corrected time information (step S1705). Then, startup processing for other processes is carried out (step S1706), and the ordinary processing is started upon completion of the startup processing (step S1707).

The time correction method is such that the time information obtained from the time storage section 1114 is converted to a number of seconds accumulated since Jan. 1, 1970, adds a correction number of seconds stored in the correction information (e.g. information on a time period required for execution of a reboot) retained in the time correction information 1132 to the accumulated number of seconds, and converts the resulting sum back to present date and time. Besides this method, various other method can be employed. For example, a method can be employed, in which a correction number of minutes and a correction number of seconds are retained in the correction information, the time notation is corrected by adding a further correction number of seconds and a further correction number of minutes to respective positions of second and minute of the correction information, and executing processing when the resulting sum exceeds 60 seconds, processing when the sum exceeds 60 minutes, and processing when the sum exceeds 24 hours.

The gist of the present embodiment lies in correction of the time information to set time, irrespective of the time correction method. As a result, when a reboot takes place, it is possible to make a correction by the time period used for the reboot.

Although in the present embodiment, time correction is carried out at the startup of the apparatus, the time correction may be carried out when the time is recorded, in a similar manner to the above described manner, which also provides the same effects.

As can be learned from the above described embodiments, the present invention realizes an information processing apparatus which does not have an RTC, a time setting section, or a section for automatically acquiring time from an external device, and which uses time at the time of termination of a previous operation upon startup of the apparatus, as the present time upon the next startup of the apparatus. However, the present invention can be applied to an information processing apparatus which has a time setting section, or a section for automatically acquiring time from an external device, by utilizing the section as time setting means when the information processing apparatus is not operating.

Further, it is also possible to avoid coexistence of two kinds of time in the information processing apparatus, which causes a problem that a future date is created as the date of creation of a file in the information processing apparatus.

Furthermore, even when an information processing apparatus has a means for externally setting time, if the means is not operable, the time provided by the present invention can be used as temporary time to be set upon startup of the information processing apparatus.

The monitoring apparatus 1 according to above described respective embodiments may be an apparatus having a printing section which carries out printing, for example, a printer.

It goes without saying that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the novel functions of any of the above described embodiments, and hence the program code and a storage medium on which the program code is stored constitute the present invention.

Further, examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a magnetic tape, a nonvolatile memory card, a ROM, and an EEPROM. Alternatively, the program is supplied by downloading via a network or the like.

Moreover, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the embodiments described above may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An information processing apparatus connectable to a network having thereon a server for processing e-mails, the information processing apparatus comprising:
    a creation unit adapted to create an e-mail addressed to the information processing apparatus, with time of the transmission of the e-mail contained in a body of the e-mail;
    a receiving unit adapted to receive an e-mail created corresponding to the transmitted e-mail created by said creation unit from the server, wherein the server includes in the e-mail time of the reception of the e-mail received by the server; and
    a time setting unit adapted to set present time based on the time of the transmission of the e-mail and the time of the reception of the e-mail by the server, both of which are contained in the e-mail received by said receiving unit.

2. An information processing apparatus according to claim 1, further comprising an NTP time information acquisition unit adapted to acquire time information using NTP, and
    wherein said time setting unit is adapted to carry out the setting of the present time based on the time of the transmission of the e-mail and the time of the reception of the e-mail by the server, concurrently with the time information acquired by said NTP time information acquisition unit.

3. An information processing apparatus according to claim 2, wherein said time setting unit is adapted to carry out the setting of the present time based on the time of the transmission of the e-mail and the time of the reception of the e-mail by the server, without using the time information acquired by said NTP time acquisition unit when the time information has not been acquired by said NTP time information acquisition unit.

4. An information processing apparatus according to claim 1, further comprising a storage unit adapted to retain time information upon shutdown, and
    wherein said time setting unit is adapted to correct the time retained by said storage unit based on the predetermined correction information on a time period required for execution of reboot, and sets the corrected time as the present time.

5. An information processing apparatus according to claim 1, wherein the information processing apparatus is connectable to an image forming apparatus comprising a printing device that carries out printing on a recording medium.

6. An information processing apparatus according to claim 1, wherein said information processing apparatus is adapted to manage counter information indicating an output state of an image forming apparatus connectable to a network.

7. An information processing method for an information processing apparatus connectable to a network having thereon a server for processing e-mails, the method comprising:
    a creation step of creating an e-mail addressed to the information processing apparatus, with time of the transmission of the e-mail contained in a body of the e-mail;
    a receiving step of receiving an e-mail corresponding to the transmitted e-mail created in said creating step from the server, wherein the server includes in the e-mail time of the reception of the e-mail received by the server; and
    a time setting step of setting present time based on the time of the transmission of the e-mail and the time of the reception of the e-mail by the server, both of which are contained in the e-mail received in said receiving step.

8. An information processing method according to claim 7, further comprising an NTP time information acquisition step of acquiring time information using NTP, and
    wherein in said time setting step, the setting of the present time is carried out based on the time of the transmission of the e-mail and the time of the reception of the e-mail by the server, concurrently with the time information acquired in said NTP time information acquisition step.

9. An information processing method according to claim 8, wherein in said time setting step, the setting of the present time is carried out based on the time of the transmission of the e-mail and the time of the reception of the e-mail by the server, without using the time information acquired in said NTP time information acquisition step when the time information has not been acquired in said NTP time information acquisition step.

10. An information processing method according to claim 7, further comprising a storing step of retaining time information upon shutdown, and
    wherein in said time setting step, the time retained in said storage step is corrected based on the predetermined correction information on a time period required for execution of a reboot, and the corrected time is set as the present time.

11. An information processing method according to claim 7, wherein the information processing apparatus is connectable to a printer, the method further comprising a printing step of carrying out printing with the printer on a recording medium.

12. A computer-readable medium storing a computer program for controlling an information processing apparatus connectable to a network having thereon a server for processing e-mails, the computer program comprising:

a creation module for creating an e-mail addressed to the information processing apparatus, with time of the transmission of the e-mail contained in a body of the e-mail;

a receiving module for receiving an e-mail corresponding to the transmitted e-mail created in said creating module from the server, wherein the server includes in the e-mail time of the reception of the e-mail received by the server; and a time setting module for setting present time based on the time of the transmission of the e-mail and the time of the reception of the e-mail by the server, both of which are contained in the e-mail received in said receiving module.

* * * * *